United States Patent
Sakaguchi

(10) Patent No.: US 10,967,251 B2
(45) Date of Patent: Apr. 6, 2021

(54) GAME SYSTEM, GAME APPARATUS, STORAGE MEDIUM AND GAME CONTROL METHOD

(71) Applicant: NINTENDO CO., LTD., Kyoto (JP)

(72) Inventor: Tsubasa Sakaguchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 131 days.

(21) Appl. No.: 16/254,645

(22) Filed: Jan. 23, 2019

(65) Prior Publication Data
US 2019/0374852 A1    Dec. 12, 2019

(30) Foreign Application Priority Data

Jun. 8, 2018  (JP) .............................. JP2018-109934

(51) Int. Cl.
*A63F 13/00* (2014.01)
*A63F 9/24* (2006.01)
(Continued)

(52) U.S. Cl.
CPC .............. *A63F 13/23* (2014.09); *A63F 13/24* (2014.09); *A63F 13/25* (2014.09);
(Continued)

(58) Field of Classification Search
CPC .......... A63F 13/23; A63F 13/24; A63F 13/25; A63F 13/2145; A63F 13/245;
(Continued)

(56) References Cited

U.S. PATENT DOCUMENTS 7,942,745 B2   5/2011  Ikeda et al.
8,482,540 B1   7/2013  Reeves et al.
(Continued)

FOREIGN PATENT DOCUMENTS

JP   2002-166047   6/2002
JP   2007-083024   4/2007
(Continued)

OTHER PUBLICATIONS

Extended European Search report dated Jun. 19, 2019, issued in EP 18214014.5 (8 pages).
(Continued)

*Primary Examiner* — Milap Shah
(74) *Attorney, Agent, or Firm* — Nixon & Vanderhye, P.C.

(57) ABSTRACT

A game system that is a non-limiting example information processing system comprises a main body apparatus provided with a left controller and a right controller in an attachable and detachable manner. By operating an additional operation apparatus to which the right controller is attached, a user plays an individual game, and selects an individual game to be played in a menu image that displays a plurality of icons corresponding to a plural kinds of different games. In the menu image, a menu vehicle object related to a game vehicle object that is operated in the individual game is displayed as a designation image. The user selects an icon by moving the menu vehicle object in an operating method that is the same as an operating method for the game vehicle object.

19 Claims, 25 Drawing Sheets

(51) Int. Cl.
*A63F 13/23* (2014.01)
*A63F 13/24* (2014.01)
*A63F 13/25* (2014.01)
*A63F 13/2145* (2014.01)
*A63F 13/245* (2014.01)
*A63F 13/803* (2014.01)
*A63F 13/92* (2014.01)

(52) U.S. Cl.
CPC ......... *A63F 13/2145* (2014.09); *A63F 13/245* (2014.09); *A63F 13/803* (2014.09); *A63F 13/92* (2014.09); *A63F 2300/1025* (2013.01); *A63F 2300/1043* (2013.01); *A63F 2300/1062* (2013.01); *A63F 2300/1075* (2013.01); *A63F 2300/8017* (2013.01)

(58) Field of Classification Search
CPC .................... A63F 13/803; A63F 13/92; A63F 2300/1025; A63F 2300/1043; A63F 2300/1062; A63F 2300/1075; A63F 2300/8017
See application file for complete search history.

(56) References Cited

U.S. PATENT DOCUMENTS

| | | |
|---|---|---|
| 9,895,606 B1 | 2/2018 | Kamata et al. |
| 2011/0263328 A1 | 10/2011 | Yamashita et al. |
| 2016/0231773 A1* | 8/2016 | Inoue .................... G06F 3/005 |
| 2018/0028913 A1 | 2/2018 | Onozawa et al. |
| 2018/0043248 A1 | 2/2018 | Ogasawara et al. |
| 2018/0043270 A1 | 2/2018 | Ogasawara et al. |

FOREIGN PATENT DOCUMENTS

| | | |
|---|---|---|
| JP | 2008-067883 | 3/2008 |
| JP | 2011-227804 | 11/2011 |

OTHER PUBLICATIONS

Notification of Reasons for Refusal issued in JP 2018-109934 dated Oct. 23, 2019 (3 pages) and English translation (3 pages).
Nintendo LABO, Dengeki Nintendo, Japan, published by Kadokawa Corporation on Apr. 21, 2018, vol. 18 Item 3, pp. 12-19 (12 pages).

* cited by examiner

GAME SYSTEM, GAME APPARATUS, STORAGE MEDIUM AND GAME CONTROL METHOD

CROSS REFERENCE OF RELATED APPLICATION

The disclosure of Japanese Patent Application No. 2018-109934 filed on Jun. 8, 2018 is incorporated herein by reference.

FIELD

This application describes a game system, a game apparatus, a storage medium and a game control method, in which predetermined game processing is performed based on an operation of an accessory to which a controller is attached.

SUMMARY

It is a primary object of an embodiment(s) to provide a novel game system, game apparatus, storage medium and game control method.

Moreover, it is another object of the embodiment(s) to provide a game system, game apparatus, storage medium and game control method, capable of implementing more various operations.

A first embodiment is a game system comprising a game controller having an operation portion, an accessory to which the game controller is attachable, and a game processing portion configured to perform predetermined game processing based on an operation to the accessory to which the game controller is attached, comprising: a display portion, a first selection portion, an attachment detection portion, and a second selection portion. The display portion is configured to display a selection image for performing a selection operation related to game processing. The first selection portion is configured to allow selecting the selection image by a first method based on an operation to the operation portion of the game controller. The attachment detection portion is configured to detect that the game controller is in an attached state to the accessory. The second selection portion is configured to allow selecting the selection image by a second method different from the first method based on an operation to the accessory when it is detected by the attachment detection portion that the game controller is in the attached state.

According to the first embodiment, since the selection image is selected by a method different from a method of operating the operation portion of the controller when the controller is attached to the accessory, it is possible to implement more various operations using the controller.

A second embodiment is the game system according to the first embodiment, wherein the game controller further comprises an operation detection portion configured to detect an operation to the accessory. The second selection portion is configured to allow selecting the selection image by the second method based on a detection result by the operation detection portion.

A third embodiment is the game system according to the second embodiment, wherein the game controller further comprises an imaging portion as the operation detection portion. The accessory comprises an operation portion, a movable portion configured to be moved according to an operation to the operation portion, and a detection target that is provided on the movable portion and is capable of being imaged by the imaging portion of the game controller attached to the accessory. The game system further comprises an operation manner determination portion configured to determine an operation manner to the accessory based on at least one of a position, a shape and a direction of the detection target included in an image that is imaged by the imaging portion.

A fourth embodiment is the game system according to the second embodiment, wherein the game controller further comprises an imaging portion as the operation detection portion. The accessory further comprises an insertion portion for inserting and attaching the game controller, and a detection target that is provided in an inside of the accessory and is capable of being imaged by the imaging portion of the game controller. The attachment detection portion is configured to detect whether the game controller is in an attached state to the accessory based on an image including the detection target imaged by the imaging portion of the game controller that is being inserted and attached to the insertion portion.

A fifth embodiment is the game system according to the second embodiment, wherein the game processing portion performs predetermined game processing based on a detection result of the operation detection portion.

According to the fifth embodiment, using the accessory, a selection operation for the game processing, and also, a game operation for performing the game processing can be performed.

A sixth embodiment is the game system according to the first embodiment, wherein the display portion is configured to a first object. The second selection portion allows selecting the selection image by operating the first object based on an operation to the accessory, as the second method.

According to the sixth embodiment, it is possible to select the selection image by operating the first object by an operation to the accessory to which the game controller is attached.

A seventh embodiment is the game system according to the sixth embodiment, wherein the display portion is configured to display a second object when the game processing is to be performed by the game processing portion. The game processing portion is configured to cause the second object to move in a direction based on a direction instructing operation to the accessory. The second selection portion is configured to cause, based on the same direction instructing operation to the accessory, the first object to move in the same direction.

According to the seventh embodiment, the first object and the second object are controllable by the same operation using the accessory. Therefore, even if an operation target is changed from the second object to the first object, it is possible to perform selection by operating the first object with the same operational feeling as that in operating the second object.

An eighth embodiment is the game system according to the first embodiment, further comprising a game processing starting portion configured to start the game processing by selecting the selection image during selection by the second selection portion.

According to the eighth embodiment, since the game processing is started by selecting the selection image, it is possible to continuously perform the operation to the accessory, whereby time and effort such as exchange of the game controller can be saved.

A ninth embodiment is the game system according to the first embodiment, wherein the display portion is configured to further display a predetermined object that is operable based on the operation to the accessory when selection by at least the second selection portion becomes to be allowed.

According to the ninth embodiment, since the predetermined object is displayed, it is possible to know at a glance that the selection by the second selection portion becomes to be allowed.

A tenth embodiment is the game system according to the first embodiment, wherein the display portion is configured to display the first object that is operable based on the operation to the accessory when it is detected by the attachment detection portion that the game controller is in an attached state to the accessory, and display the second object related in appearance to the first object when the game processing is to be performed.

According to the tenth embodiment, since the second object is related in appearance to the first object, it is possible to intuitively know that it is sufficient to operate the first object with the same feeling as the operation the game processing.

An eleventh embodiment is a game apparatus comprising a game controller having an operation portion, an accessory to which the game controller is attachable, and a game processing portion configured to perform predetermined game processing based on an operation to the accessory to which the game controller is attached, comprising: a display portion, a first selection portion, an attachment detection portion, and a second selection portion. The display portion is configured to display a selection image for performing a selection operation related to game processing. The first selection portion is configured to allow selecting the selection image by a first method based on an operation to the operation portion of the game controller. The attachment detection portion is configured to detect that the game controller is in an attached state to the accessory. The second selection portion is configured to allow selecting the selection image by a second method different from the first method based on an operation to the accessory when it is detected by the attachment detection portion that the game controller is in the attached state.

A twelfth embodiment is a non-transitory computer-readable storage medium storing a game program executable by a computer of a game apparatus comprising a game controller having an operation portion, an accessory to which the game controller is attachable, and a game processing portion configured to perform predetermined game processing based on an operation to the accessory to which the game controller is attached, wherein the game program causes one or more processors of the computer to perform following steps of: a display step configured to display a selection image for performing a selection operation for game processing; a first selection step configured to allow selecting the selection image by a first method based on an operation to the operation portion of the game controller; an attachment detection step configured to detect that the game controller is in an attached state to the accessory; and a second selection step configured to allow selecting the selection image by a second method different from the first method based on an operation to the accessory when it is detected in the attachment detection step that the game controller is in the attached state.

A thirteenth embodiment is a game control method of a game apparatus comprising a game controller having an operation portion, an accessory to which the game controller is attachable, and a game processing portion configured to perform predetermined game processing based on an operation to the accessory to which the game controller is attached, comprising following steps of: (a) displaying a selection image for performing a selection operation for game processing; (b) allowing selecting the selection image by a first method based on an operation to the operation portion of the game controller; (c) detecting that the game controller is in an attached state to the accessory; and (d) allowing selecting the selection image by a second method different from the first method based on an operation to the accessory when it is detected in the step (c) that the game controller is in the attached state.

According also to respective one of the eleventh embodiment to the thirteenth embodiment, it is possible to implement more various operations, like the first embodiment.

The above described objects and other objects, features, aspects and advantages of the embodiment(s) will become more apparent from the following detailed description when taken in conjunction with the accompanying drawings.

DETAILED DESCRIPTION OF NON-LIMITING EXAMPLE EMBODIMENTS

A non-limiting example game system according to an exemplary embodiment will be described in the following. The game system 1 according to this embodiment comprises a main body apparatus (an information processing apparatus that functions as a game apparatus main body in this embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2).

Figure 1:
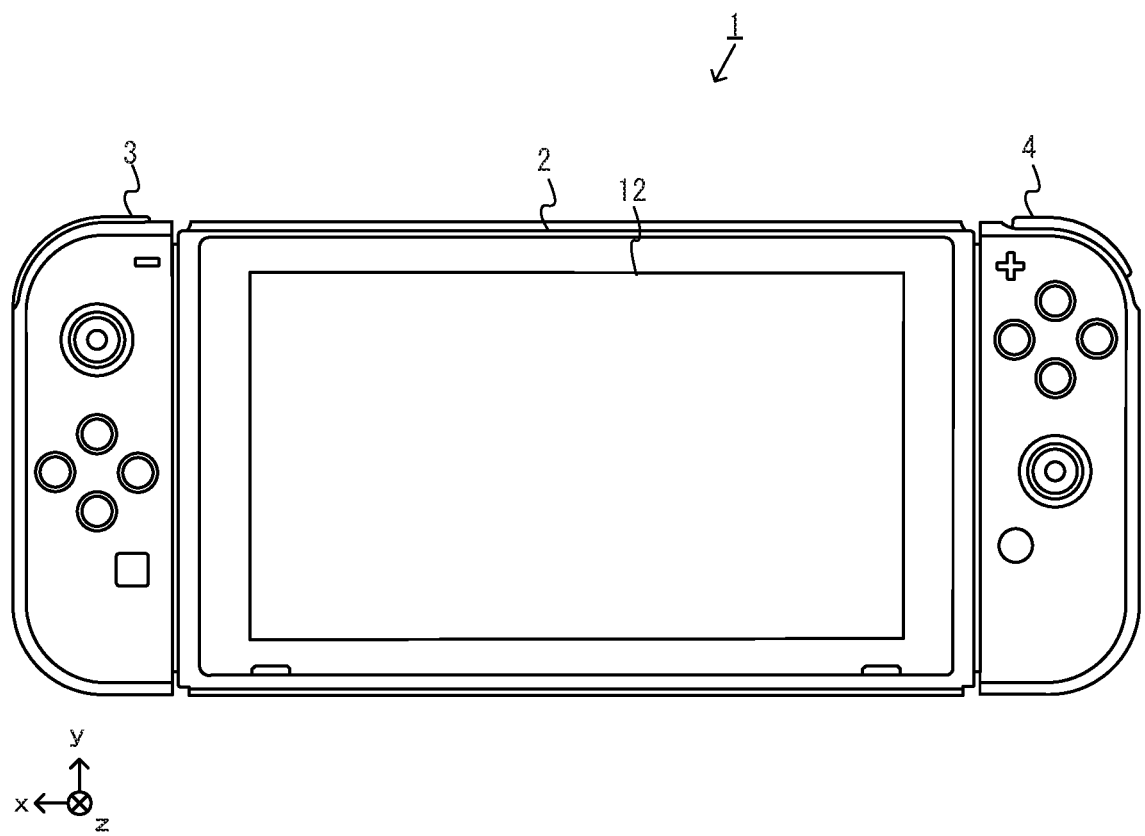
FIG. 1 is an illustration view showing a non-limiting example state where a left controller and a right controller are attached to a main body apparatus of an embodiment.

In addition, details will be described later, the game system 1 comprises an attachment(s) (additional operation apparatuses (6, 7) described later) to which the controller 3 or 4. Hereinafter, first, hardware configurations of the main body apparatus 2 and the controllers 3 and 4 will be described, and then, a configuration of the attachment and processing of the game system 1 in a case where the attachment is used will be described. FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
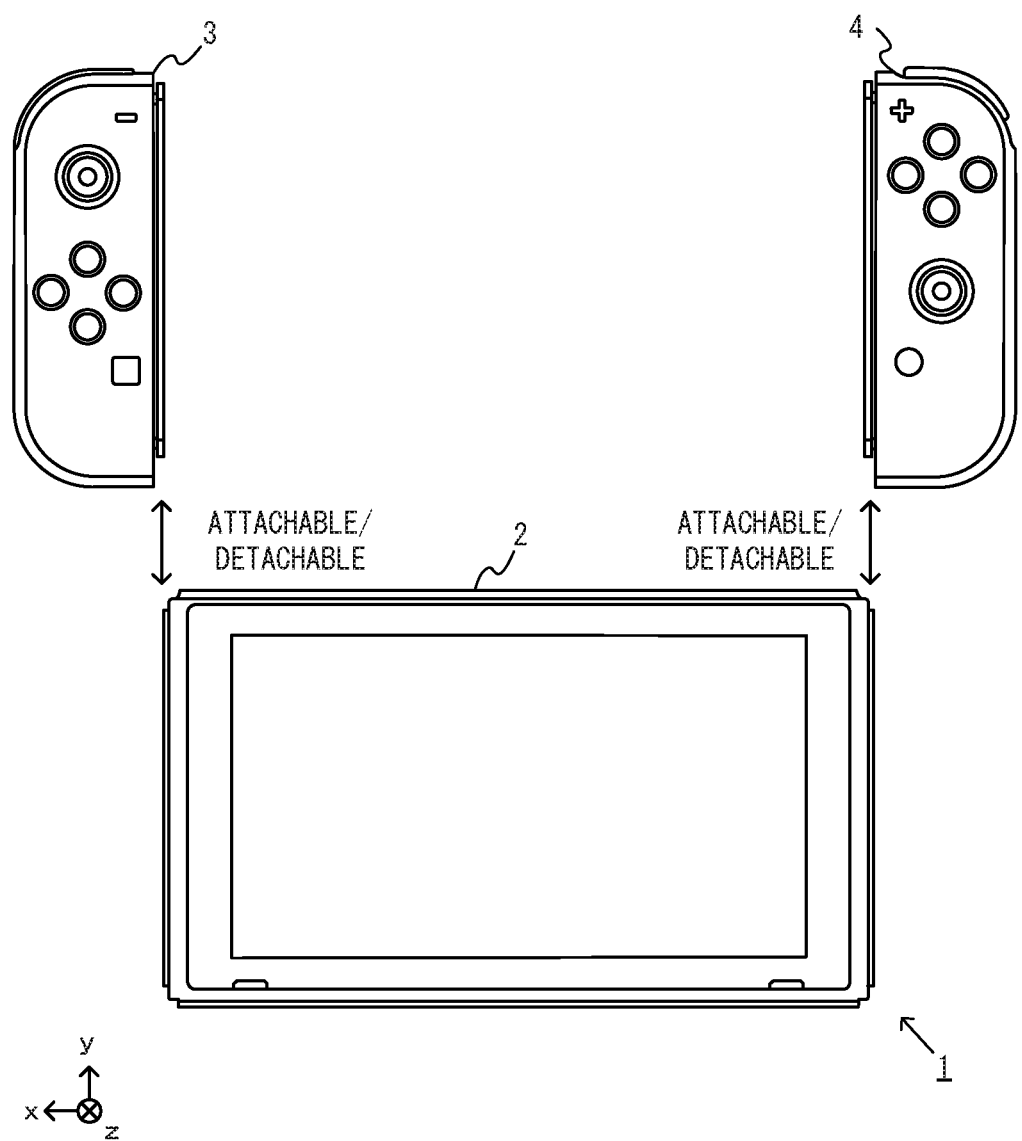
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIGS. 1 and 2, each of the left controller 3 and the right controller 4 are attachable to and detachable from the main body apparatus 2. In addition, it should be noted that the left controller 3 and the right controller 4 may be referred to collectively as a "controller" in the following.

Figure 3:
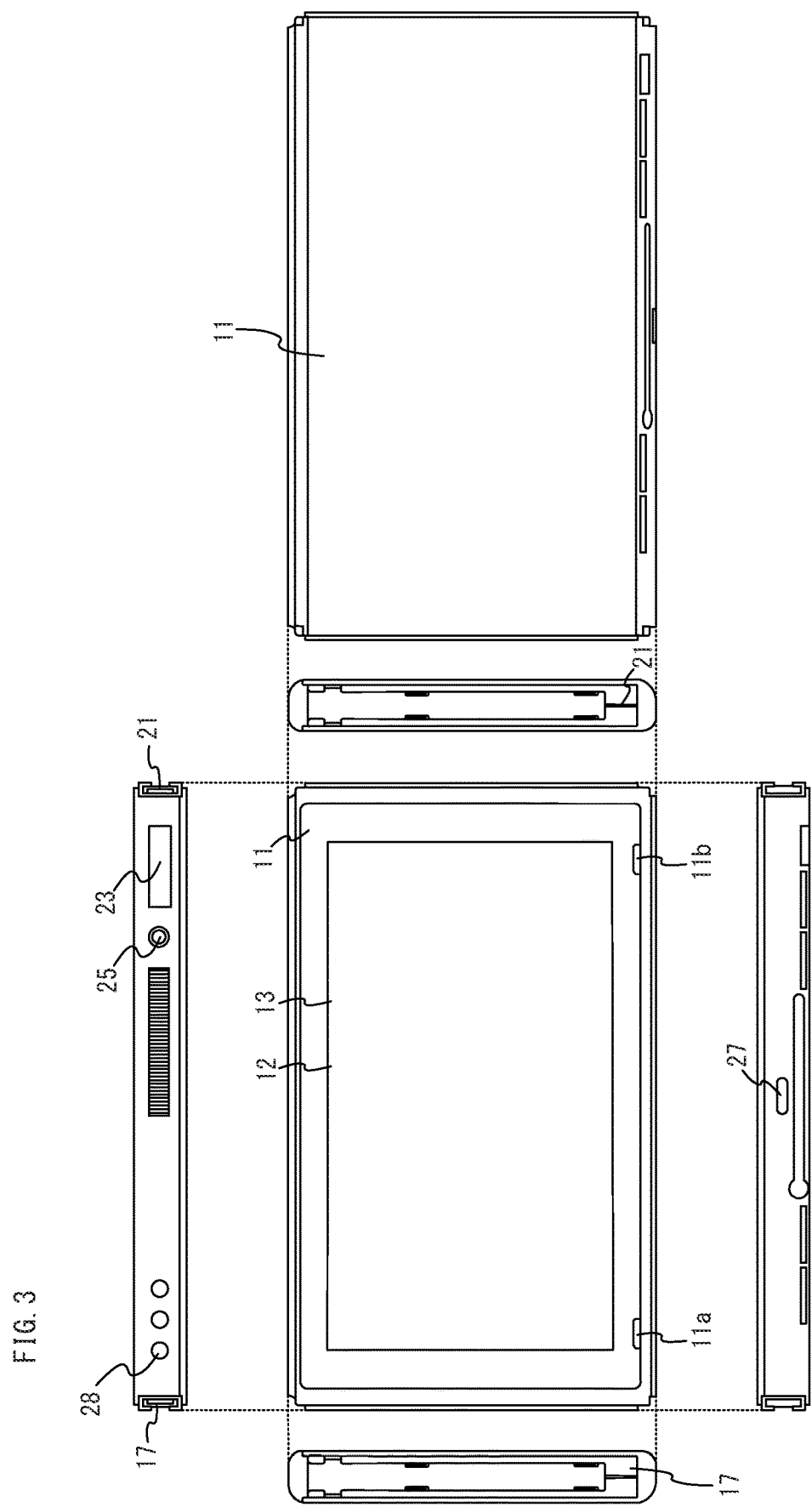
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In this embodiment, a main surface (in other words, a surface on a front side, i.e., a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may function as a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In this embodiment, the display 12 is a liquid crystal display device (LCD). However, the display 12 may be a display device of any type. Moreover, the main body apparatus 2 comprises a touch panel 13 on a screen of the display 12. In this embodiment, the touch panel 13 is of a type that allows a multi-touch input (e.g., a capacitive type). However, the touch panel 13 may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are emitted through the speaker holes 11a and 11b.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In this embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in this embodiment, the cradle has the function of charging the unified apparatus or the main body apparatus 2 alone that is put on the cradle. Moreover, the cradle has a function of a hub device (specifically, a USB hub).

Figure 4:
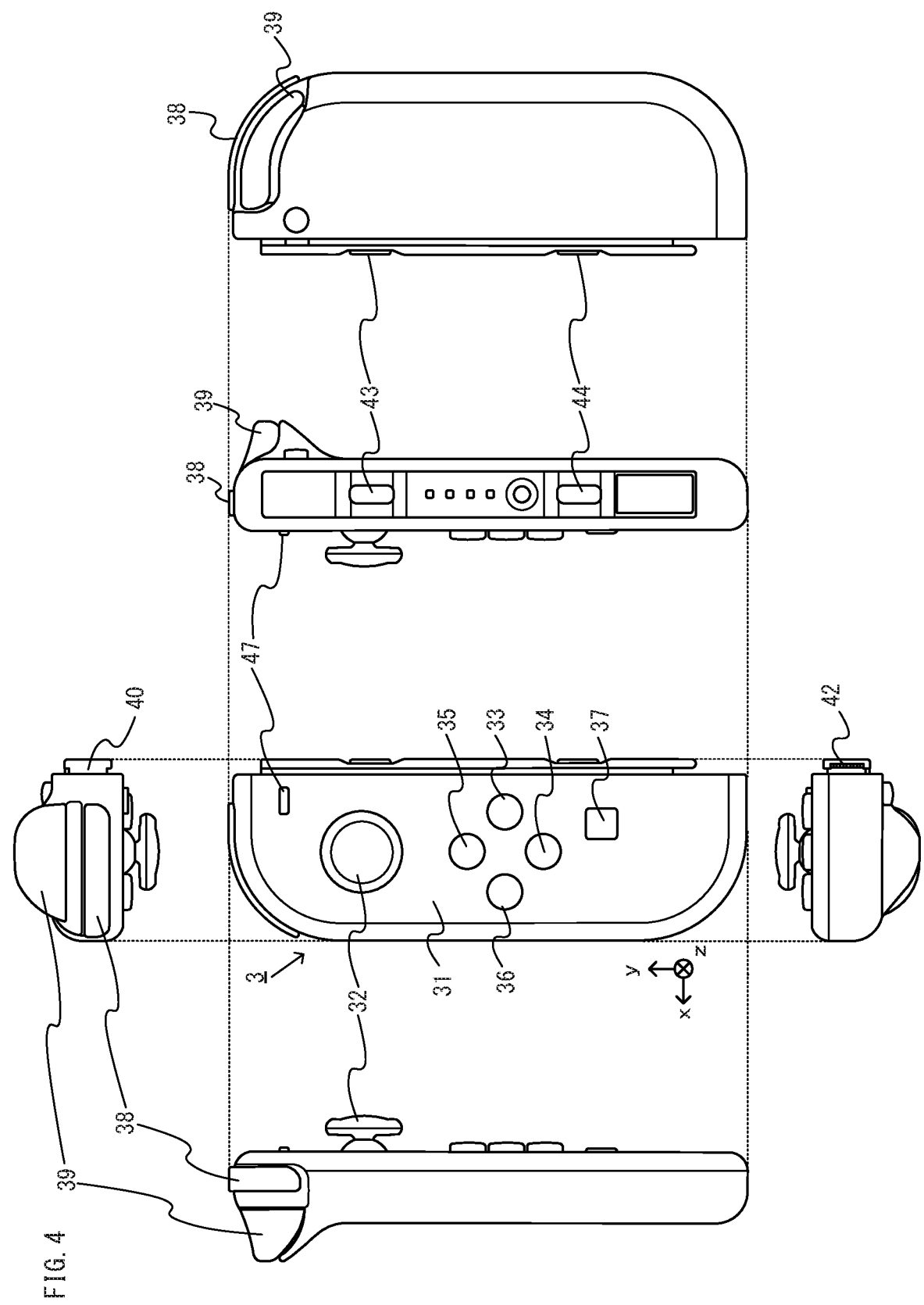
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In this embodiment, the housing 31 has a vertically long shape, i.e., is shaped to be long in an up-down direction (i.e., a y-axis direction shown in FIGS. 1 and 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in this embodiment, it is possible to provide an input by pressing the analog stick 32.

The left controller 3 comprises various operation buttons. The left controller 3 comprises four (4) operation buttons 33-36 (specifically, a right direction button 33, a down direction button 34, an up direction button 35 and a left direction button 36) on the main surface of the housing 31. Furthermore, the left controller 3 comprises a record button 37 and a "−" (minus) button 47. The left controller 3 comprises a first L-button 38 and a ZL-button 39 in an upper left portion of a side surface of the housing 31. Moreover, the left controller 3 comprises a second L-button 43 and a second R-button 44 on a surface at a side to be attached to the main body apparatus 2 out of side surfaces of the housing 31. These operation buttons are used to input instructions according to various programs (e.g., an OS program and an application program) executed by the main body apparatus 2.

Moreover, the left controller 3 comprises a terminal 42 for the left controller 3 to perform wired communication with the main body apparatus 2.

Figure 5:
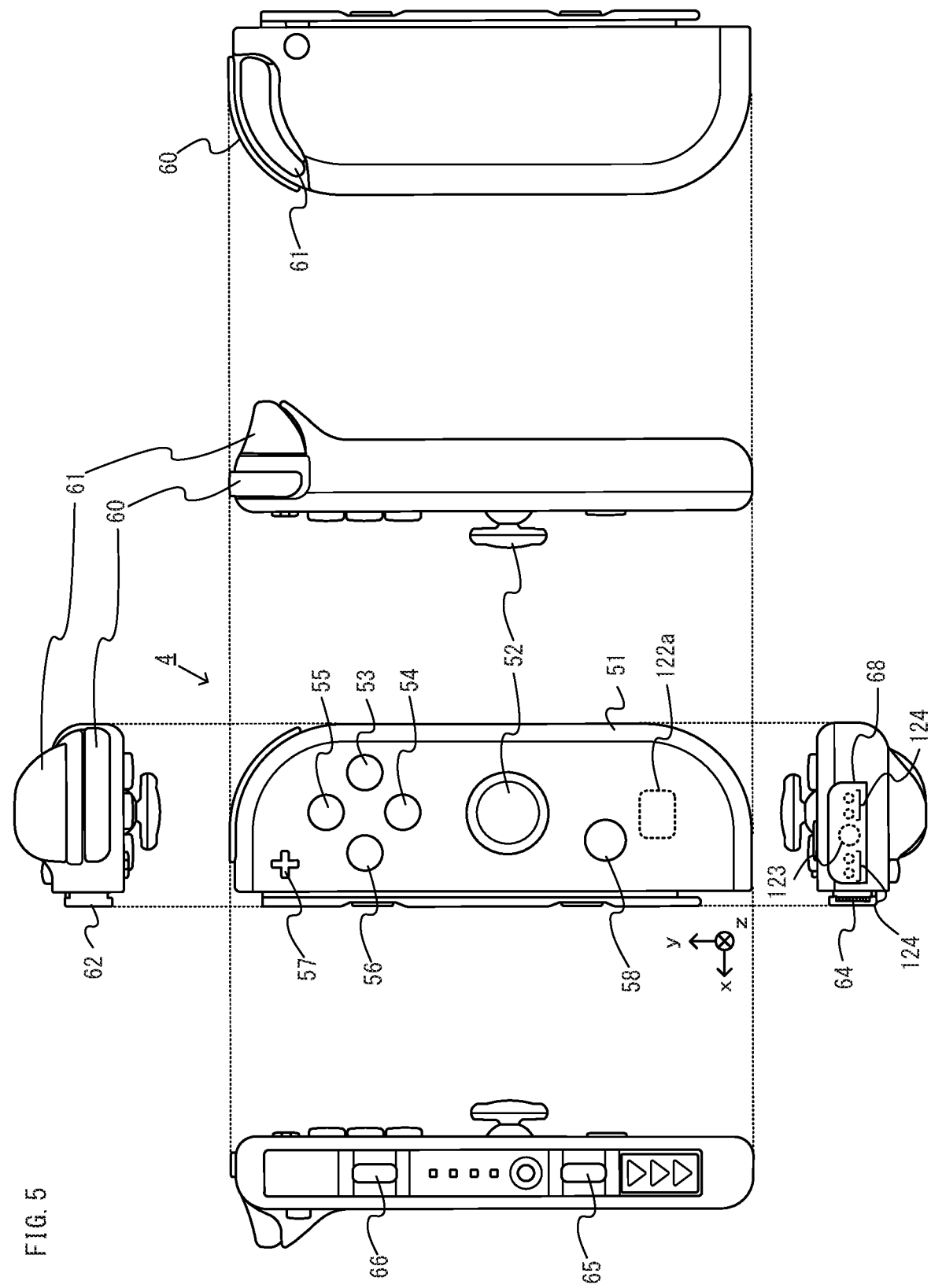
FIG. 5 is sixth orthogonal views showing a non-limiting example right controller shown in FIG. 1 and FIG. 2.

FIG. 5 is six orthogonal views showing an example of the right controller 4. As shown in FIG. 5, the right controller 4 comprises a housing 51. In this embodiment, the housing 51 has a vertically long shape, i.e., a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In this embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises a first R-button 60 and a ZR-button 61 in an upper right portion of a side surface of the housing 51. Moreover, similar to the left controller 3, the right controller 4 comprises a second L-button 65 and a second R-button 66.

Moreover, a window portion 68 is provided on a lower side surface of the housing 51. Although details will be described later, the right controller 4 comprises an infrared imaging section 123 and an infrared light-emitting section 124, which are placed within the housing 51. The infrared imaging section 123 is an example of "operation detection portion", and images a portion around the right controller 4 through the window portion 68 such that a down direction of the right controller 4 (a negative direction of a y-axis shown in FIG. 5) is an image capturing direction. The infrared light-emitting section 124 irradiates infrared light through the window portion 68 to an image capturing target to be captured by the infrared imaging section 123 such that a predetermined range centered on the lower direction of the right controller 4 (a negative direction of the y-axis in FIG. 5) is an irradiation range. The window portion 68 is used to protect a lens of a camera of the infrared imaging section 123, a light emitter of the infrared light-emitting section 124 and the like, and formed of a material that transmits light of a wavelength sensed by the camera and light emitted from the light emitter (e.g., a transparent material). In addition, the window portion 68 may be a through hole formed in the housing 51. In addition, in this embodiment, the infrared imaging section 123 itself has a filter member for inhibiting transmission of light of a wavelength other than the light sensed by the camera (infrared light in this embodiment). However, in another embodiment, the window portion 68 may have a filter function.

Moreover, although details will be described later, the right controller 4 comprises an NFC communication section 122. The NFC communication section 122 performs short-range wireless communication based on the NFC (Near Field Communication) standard. The NFC communication section 122 has an antenna 122a to be used for short-range wireless communication and a circuit (e.g., an NFC chip) that generates a signal (a radio wave) to be sent from the antenna 122a. In addition, the NFC communication section 122 may perform short-range wireless communication through any proximity communication (or contactless communication) instead of performing short-range wireless communication based on the NFC standard. Here, the NFC standard can be used for proximity communication (contactless communication), and "may perform short-range wireless communication through any proximity communication" is intended to mean that short-range wireless communication may be performed through other proximity communication except for proximity communication based on the NFC standard.

Moreover, the right controller 4 comprises a terminal 64 for the right controller 4 to perform wired communication with the main body apparatus 2.

Figure 6:
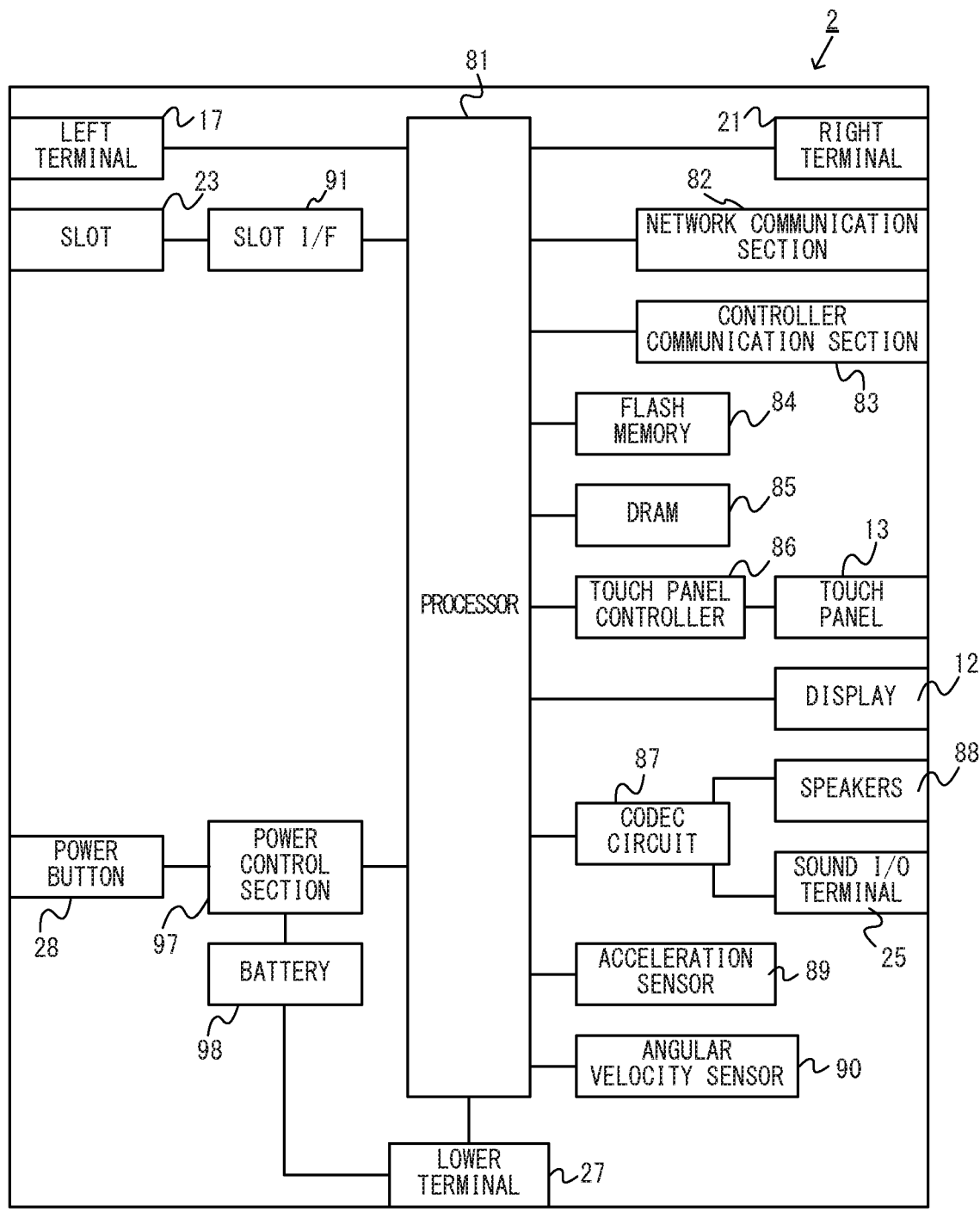
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG. 3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot I/F 91 is connected to the processor 81. The slot I/F 91 is connected to the slot 23, and reads and writes, in accordance with instructions from the processor 81, data from and to the predetermined type of storage medium (e.g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In this embodiment, as a first communication manner, the network communication section 82 is connected to a wireless LAN to perform communication with external apparatus by a system in compliant with the Wi-Fi standard. Moreover, as a second communication manner, the network communication section 82 performs wireless communication with a further main body apparatus 2 of the same type by a predetermined communication system (e.g., communication based on a unique protocol or infrared light communication). In addition, the wireless communication in the above-described second communication manner achieves a function of enabling so-called "local communication", in which the main body apparatus 2 can perform wireless communication with further main body apparatus 2 placed in a closed local network area, and a plurality of main body apparatus 2 perform communication directly with each other to transmit and receive data.

The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in this embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives operation data from the left controller 3 via the left terminal 17. Moreover, when performing wired communication with the right controller 4, the processor 81 transmits data to the right controller 4 via the right terminal 21 and receives operation data from the right controller 4 via the right terminal 21. Moreover, when performing communication with the cradle, the processor 81 transmits data to the cradle via the lower terminal 27. Thus, in this embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e.g., image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e.g., an image generated by performing or executing the above information processing) and/or an externally acquired image on the display 12.

The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

Moreover, the main body apparatus 2 comprises an acceleration sensor 89. In this embodiment, the acceleration sensor 89 detects magnitudes of accelerations along predetermined three (3) axial (e.g., x, y and z axes shown in FIG. 1) directions. In addition, that the acceleration sensor 89 may detect an acceleration along one (1) axial direction or accelerations along two (2) axial directions.

Moreover, the main body apparatus 2 comprises an angular velocity sensor 90. In this embodiment, the angular velocity sensor 90 detects angular velocities around predetermined three (3) axes (e.g., the x, y and z axes shown in FIG. 1). In addition, the angular velocity sensor 90 may detect an angular velocity around one (1) axis or angular velocities around two (2) axes.

The acceleration sensor 89 and the angular velocity sensor 90 are connected to the processor 81, and detection results of the acceleration sensor 89 and the angular velocity sensor 90 are output to the processor 81. Based on the detection results of the acceleration sensor 89 and the angular velocity sensor 90, the processor 81 can calculate information regarding a motion and/or a posture (or an orientation) of the main body apparatus 2. The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
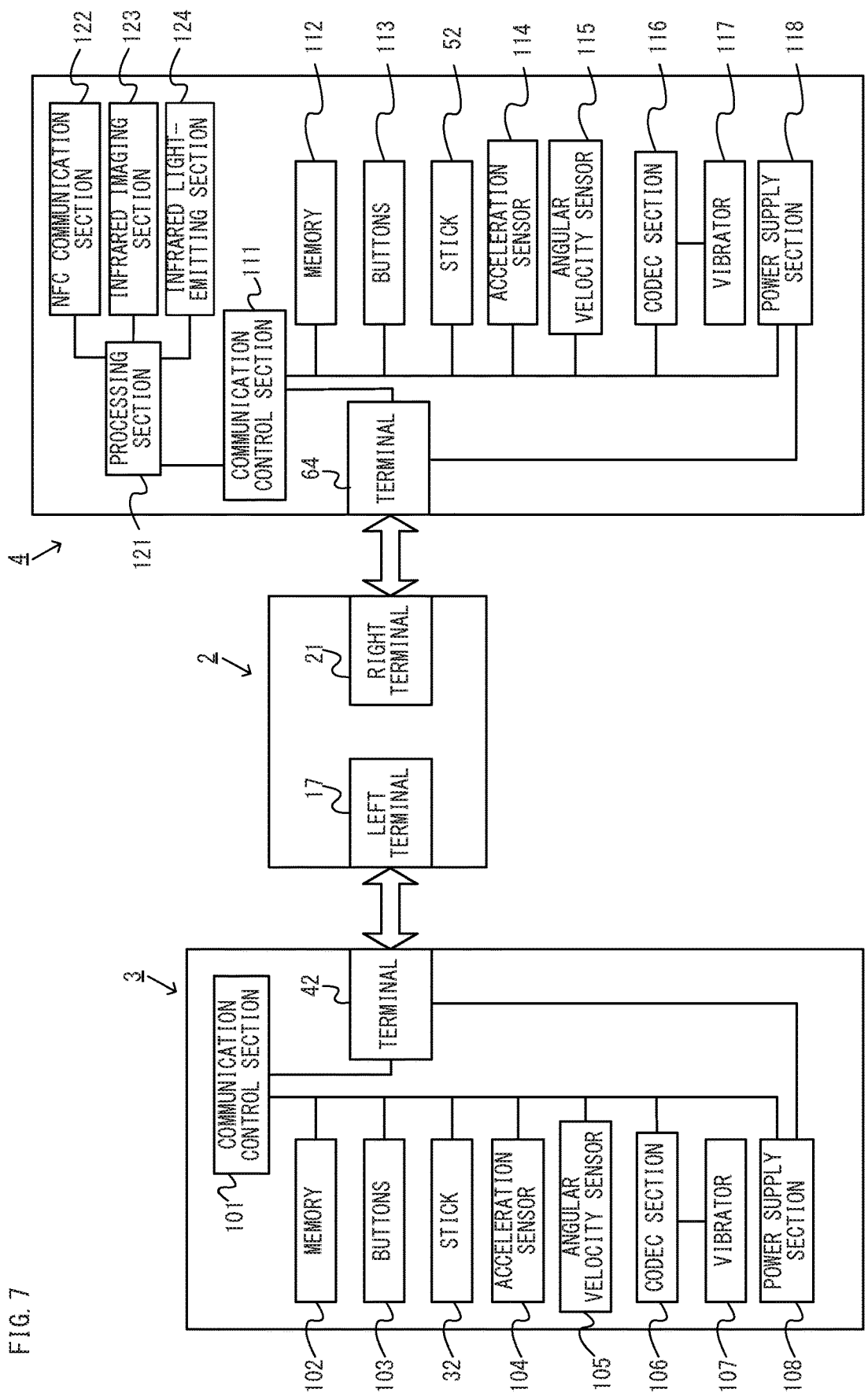
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In this embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2. That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example.

Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The left controller 3 comprises inertial sensors. Specifically, the left controller 3 comprises an acceleration sensor 104. Moreover, the left controller 3 comprises an angular velocity sensor 105. In this embodiment, the acceleration sensor 104 detects magnitudes of accelerations along predetermined three (3) axial (e.g., x, y and z axes shown in FIG. 4) directions. In addition, the acceleration sensor 104 may detect an acceleration along one (1) axial direction or accelerations along two (2) axial directions. In this embodiment, the angular velocity sensor 105 detects angular velocities around predetermined three (3) axes (e.g., x, y and z axes shown in FIG. 4). In addition, the angular velocity sensor 105 may detect an angular velocity around one (1) axis or angular velocities around two (2) axes. The acceleration sensor 104 and the angular velocity sensor 105 are respectively connected to the communication control section 101. Then, detection results of the acceleration sensor 104 and the angular velocity sensor 105 are output to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every predetermined time period. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data. Moreover, the main body apparatus 2 can calculate information regarding the motion and/or the posture of the left controller 3 based on the operation data (specifically, the detection results of the acceleration sensor 104 and the angular velocity sensor 105).

The left controller 3 comprises a vibrator 107 for notifying to the user by vibration. In this embodiment, the vibrator 107 is controlled by a command from the main body apparatus 2. That is, if receiving the above-described command from the main body apparatus 2, the communication control section 101 causes the vibrator 107 to be driven in accordance with the received command. Here, the left controller 3 comprises a codec section 106. If receiving the above-described command, the communication control section 101 outputs a control signal according to the command to the codec section 106. The codec section 106 generates a driving signal for causing the vibrator 107 to be driven from the control signal from the communication control section 101, and outputs the control signal to the vibrator 107. Accordingly, the vibrator 107 operates.

More specifically, the vibrator 107 is a linear vibration motor. Unlike a regular motor that performs a rotational motion, the linear vibration motor is driven in a predetermined direction in accordance with an input voltage and thus generates at amplitude and a frequency according to a waveform of the input voltage. In this embodiment, a vibration control signal transmitted from the main body apparatus 2 to the left controller 3 may be a digital signal representing the frequency and the amplitude every unit of time. Although the main body apparatus 2 may transmit information indicating the waveform itself in a further embodiment, transmission of only the amplitude and the frequency enables a reduction in an amount of communication data. Furthermore, in order to further reduce an amount of data, only differences between numerical values of the amplitude and the frequency at that time and previous values of the amplitude and the frequency may be transmitted, instead of the numerical values. In this case, the codec section 106 converts a digital signal indicating the values of the amplitude and the frequency acquired from the communication control section 101 into a waveform of an analog voltage and inputs a voltage in accordance with the waveform, thereby to drive the vibrator 107. Therefore, by changing the amplitude and the frequency to be transmitted every unit time, the main body apparatus 2 can control the amplitude and the frequency that cause the vibrator 107 to be vibrated at that time. In addition, not only single amplitude and a single frequency, but also two or more amplitudes and two or more frequencies may be transmitted from the main body apparatus 2 to the left controller 3. In this case, the codec section 106 combines waveforms indicated by a plurality of received amplitudes and frequencies and thereby can generate the waveform of a voltage for controlling the vibrator 107.

The left controller 3 comprises a power supply section 108. In this embodiment, the power supply section 108 has a battery and a power control circuit. Although not shown in FIG. 7, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113, the analog stick 52 and inertial sensors (an acceleration sensor 114 and an angular velocity sensor 115). These input sections have functions similar to those of the input sections of the left controller 3 and operate similarly to the input sections of the left controller 3.

Moreover, the right controller 4 comprises a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 comprises an NFC communication section 122 that performs short-range wireless communication based on the NFC standard. The NFC communication section 122 has a function of a so-called NFC reader/writer. Here, the term "short-range wireless communication" as used herein includes a communication system that a radio wave from an apparatus (here, the right controller 4) develops an electromotive force (e.g., by electromagnetic induction) in a further device (here, a device near the antenna 122a). The further device can operate by the developed electromotive force, and may or may not have a power supply. When the right controller 4 (the antenna 122a) and a communication target come close to each other (typically, the distance between the right controller 4 and the communication target becomes dozen centimeters or less), the NFC communication section 122 becomes able to communicate with the communication target. The communication target is any apparatus capable of performing short-range wireless communication with the NFC communication section 122 and is, for example, an NFC tag or a storage medium having a function of the NFC tag. However, the communication target may be other apparatus having an NFC card emulation function.

Moreover, the right controller 4 comprises an infrared imaging section 123. The infrared imaging section 123 has an infrared camera that images a portion around the right controller 4. As an example, the main body apparatus 2 and/or the right controller 4 calculate information of the captured image (e.g., information related to luminance of each of a plurality of blocks into which at least a whole of a partial area of a captured image is divided or the like), and based on the calculated information, determine a change in the portion around the right controller 4. Moreover, the infrared imaging section 123 may capture an image using ambient light, but in this embodiment, has an infrared light-emitting section 124 that emits infrared light. The infrared light-emitting section 124 irradiates infrared light, for example, in synchronous with a timing when the infrared camera images an image. Then, the infrared light emitted from the infrared light-emitting section 124 is reflected by an image capturing target, and the infrared camera receives the reflected infrared light, thereby acquiring an image of the infrared light. This enables the infrared imaging section 123 to obtain a clearer infrared light image. In addition, the infrared imaging section 123 and the infrared light-emitting section 124 may be provided as different devices in the right controller 4, or may be provided as a single device in the same package in the right controller 4. Moreover, although the infrared imaging section 123 having an infrared camera is used in this embodiment, in other embodiments, a visible light camera (a camera using a visible light image sensor) may be used as an imaging section, instead of the infrared camera.

The right controller 4 comprises a processing section 121. The processing section 121 is connected to the communication control section 111. Moreover, the processing section 121 is connected to the NFC communication section 122, the infrared imaging section 123 and the infrared light-emitting section 124, respectively. The processing section 121 performs control processing about the NFC communication section 122 in accordance with a command from the main body apparatus 2. For example, the processing section 121 controls an operation of the NFC communication section 122 in accordance with a command from the main body apparatus 2. Moreover, the processing section 121 controls a start of the NFC communication section 122 and controls an operations (specifically, reading, writing and the like) of the NFC communication section 122 performed on a communication target (e.g., an NFC tag). Moreover, the processing section 121 receives, from the main body apparatus 2, information to be transmitted to the communication target via the communication control section 111 and transfers the information to the NFC communication section 122, and acquires, from the NFC communication section 122, information received from the communication target and transmits the information to the main body apparatus 2 via the communication control section 111.

Moreover, the processing section 121 comprises a CPU, a memory and so on, and performs, in accordance with a command from the main body apparatus 2, control processing with respect to the infrared imaging section 123 based on a predetermined program (e.g., an application program for performing image processing and various calculations) stored in a storage device (e.g., a nonvolatile memory or the like) (not shown) included in the right controller 4. For example, the processing section 121 causes the infrared imaging section 123 to perform an image capturing operation, or acquires and/or calculates information based on an image capturing result (information of the captured image, information calculated from this information, and the like) and transmits the information to the main body apparatus 2 via the communication control section 111. Moreover, the processing section 121 performs control processing of managing the infrared light-emitting section 124 in accordance with a command from the main body apparatus 2. For example, the processing section 121 controls light emission of the infrared light-emitting section 124 in accordance with a command from the main body apparatus 2. In addition, a memory used by the processing section 121 in performing the processing may be provided in the processing section 121 or may be the memory 112.

The right controller 4 comprises a power supply section 118. The power supply section 118 has a function similar to that of the power supply section 108 of the left controller 3 and operates similarly to the power supply section 108.

In this embodiment, the game system 1 includes a plurality of types (here, two types) of additional operation apparatuses as peripheral equipment used together with the above-described main body apparatus 2 and each of the controllers 3 and 4. The additional operation apparatus is peripheral equipment to be used in a state where the controller is attached to the additional operation apparatus. The controller (here, the right controller 4) is attached to the additional operation apparatus in an attachable and detachable manner. Although details will be described later, in this embodiment, a user or player (hereinafter, simply referred to as a "user") attaches the controller to the additional operation apparatus, and performs a game operation using the additional operation apparatus to which the controller is attached. Thus, in this embodiment, on the assumption that the controller is a main device and the additional operation apparatus is a sub device, a game operation is performed using the sub device to which the main device is attached. However, when the controller 4 is attached to the additional operation apparatus, since the controller 4 is inserted into an insertion portion (an insertion hole 603 or an insertion hole 703) as described later (see FIG. 9, FIG. 10 and FIG. 17), it is impossible to operate the operation portion such as the stick 52 and the buttons 113 provided on the controller 4, or it is hard to operate them. Therefore, in this embodiment, the operation portion of the controller 4 is made not to be used for the game operation.

Figure 8:
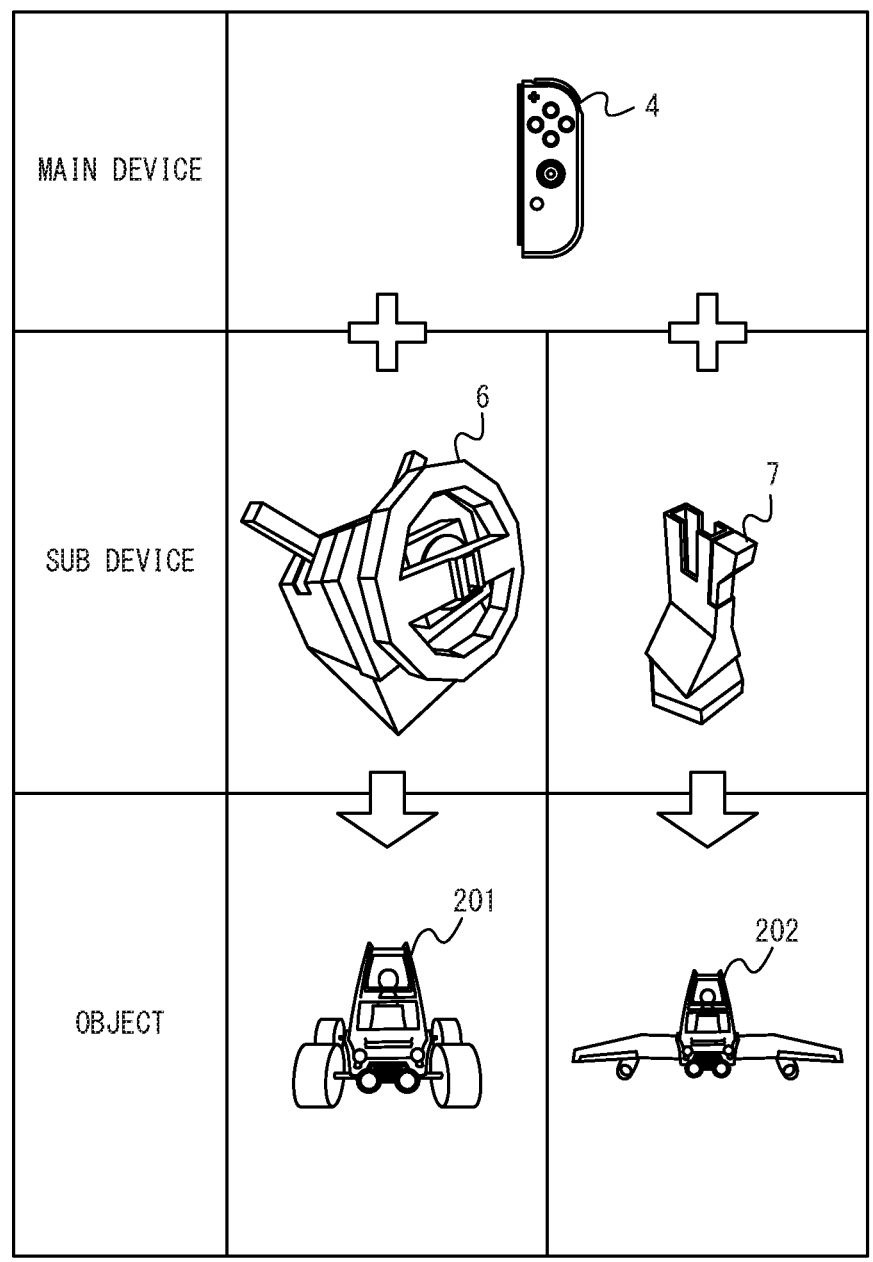
FIG. 8 is an illustration view showing a non-limiting example relationship between combination of a controller and an additional operation apparatus, and an object that is an operation target.

The game system 1 of this embodiment includes two types of additional operation apparatuses. Specifically, as shown in FIG. 8, a first additional operation apparatus 6 and a second additional operation apparatus 7 are used. In addition, in other embodiments, the number of the additional operation apparatuses included in the game system 1 may be arbitrary numbers, one, or three or more.

In this embodiment, during when performing a game application, the user plays a game using a plurality of types (here, two types) additional operation apparatuses. In addition, although the content of the game to be performed in the game application (hereinafter, may be referred to as an "individual game") is arbitrary, in this embodiment, it is a game that a player character that is operated by the user can operate various types of vehicle objects to move in a game space. The user can change the additional operation apparatus to which the controller is attached during when performing the above-described game application (more specifically, during when playing the individual game). Moreover, in the game system 1, different game processing can be performed according to the type of the additional operation apparatus to which the controller is attached. Although details will be described later, in this embodiment, the vehicle object that the player character operates is changed according to the type of the additional operation apparatus to which the controller is attached. That is, in this embodiment, the vehicle object that is an operation target that the user operates is changed according to the type of the additional operation apparatus to which the controller is attached.

FIG. 8 is an illustration view showing a relationship between combination of the controller and the additional operation apparatus and an object that is the operation target. As shown in FIG. 8, in this embodiment, it is possible to attach the right controller 4 to the first additional operation apparatus 6 or the second additional operation apparatus 7.

In this embodiment, the right controller 4 is used as a controller to be attached to the additional operation apparatus. A reason for this is that based on an imaging result by the infrared imaging section 123 provided on the right controller 4, it is detected that the right controller 4 is in an attached state to the additional operation apparatus, and a type of the additional operation apparatus to which the right controller 4 is attached is determined, and the object is operated. In addition, details of a method of determining the type of the additional operation apparatus and a method of operating the object will be described later.

In a case where the right controller 4 is in a state of being attached to the additional operation apparatus (hereinafter, referred to as an "attached state") and the type of the additional operation apparatus to which the right controller 4 is attached is the first additional operation apparatus 6 (hereinafter, referred to as a "first attached state"), a car (automobile) object 201 that the player character operates appears in a game space of the individual game as shown in FIG. 8. When the right controller 4 is in the first attached state, the user operates the car object 201 of the individual game using the first additional operation apparatus 6 to which the right controller 4 is attached. That is, if it is determined that the right controller 4 is attached to the first additional operation apparatus 6, the game system 1 arranges the player character and the car object 201 in the game space of the individual game. Then, the game system 1 controls an operation of the car object 201 based on an operation to the first additional operation apparatus 6 to which the right controller 4 is attached.

Moreover, in a case where the right controller 4 is in a state of being attached to the additional operation apparatus and the type of the additional operation apparatus to which the right controller 4 is attached is the second additional operation apparatus 7 (hereinafter, referred to as a "second attached state") as shown in FIG. 8, an airplane object 202 that the player character operates appears in the game space of the individual game. When the right controller 4 becomes in the second attached state, the user operates the airplane object 202 using the second additional operation apparatus 7 to which the right controller 4 is attached. That is, if it is determined that the right controller 4 is attached to the second additional operation apparatus 7, the game system 1 arranges the player character and the airplane object 202 in the game space of the individual game. Then, the game system 1 controls a motion of the airplane object 202 based on an operation to the second additional operation apparatus 7 to which the right controller 4 is attached.

Although illustration is omitted, in a state where the right controller 4 is not attached to any additional operation apparatus (hereinafter, referred as to a "unattached state"), the vehicle object (car object or airplane object) is stopped, and the user is prevented from performing an operation on the player character, i.e., an operation using the right controller 4. For example, when the car object 201 is stopped, the car object 201 becomes in a state where an accelerator is not stepped on, and remains at a position stopped in the game space. On the other hand, when the airplane object 202 is stopped, the airplane object 202 descends in the game space and lands on the ground.

In this embodiment, even if the attachment state of the right controller 4 is changed, the game system 1 performs processing for advancing the individual game without interruption. That is, the game system 1 seamlessly advances the individual game even if there is a change in the attachment state of the right controller 4. For example, when the user intends to change the right controller 4 that is attached to the first additional operation apparatus 6 to the second additional operation apparatus 7 to be attached, the attachment state of the right controller 4 becomes the unattached state from the first attached state, and then, shifts to the second attached state. In this case, the game system 1 continues and performs the processing for advancing the individual game, without interrupting the advance of the individual game, for example, without temporarily stopping the processing in response to the attachment state becomes the unattached state. That is, in a period that the attachment state of the right controller 4 shifts to the second attached state via the unattached state from the first attached state, the game system 1 continuously receives the operation by the user, thereby performing continuously the game processing according to the operation. Thus, in this embodiment, the individual game is advanced even during a period that the user changes the attachment state of the right controller 4, whereby it is possible to allow the user to recognize an operation on the additional operation apparatus to which the right controller 4 is to be attached is a part of the game operation. Accordingly, it is possible to provide the user with new game experience that the game operation is performed while changing the additional operation apparatus to which the right controller 4 is attached during a game play.

In addition, in other embodiments, the game system 1 may suspend the processing for advancing the individual game according to the right controller 4 having been changed to the unattached state. In this case, the game system 1 may resume the processing for advancing the individual game according to the right controller 4 having been attached to any additional operation apparatus.

As described above, in this embodiment, the user can change the object that is an operation target by changing the attachment state of the right controller 4 during when playing the individual game. Therefore, according to this embodiment, it is possible to provide the user with new game experience that the individual game can be played while exchanging the additional operation apparatus to which the right controller 4 is attached according to a situation during the game, and thus, to provide highly interesting game application.

Next, respective configurations of the first additional operation apparatus 6 and the second additional operation apparatus 7 and processing to be performed when the right controller 4 is attached to each of the first additional operation apparatus 6 and the second additional operation apparatus 7 will be described.

Figure 9:
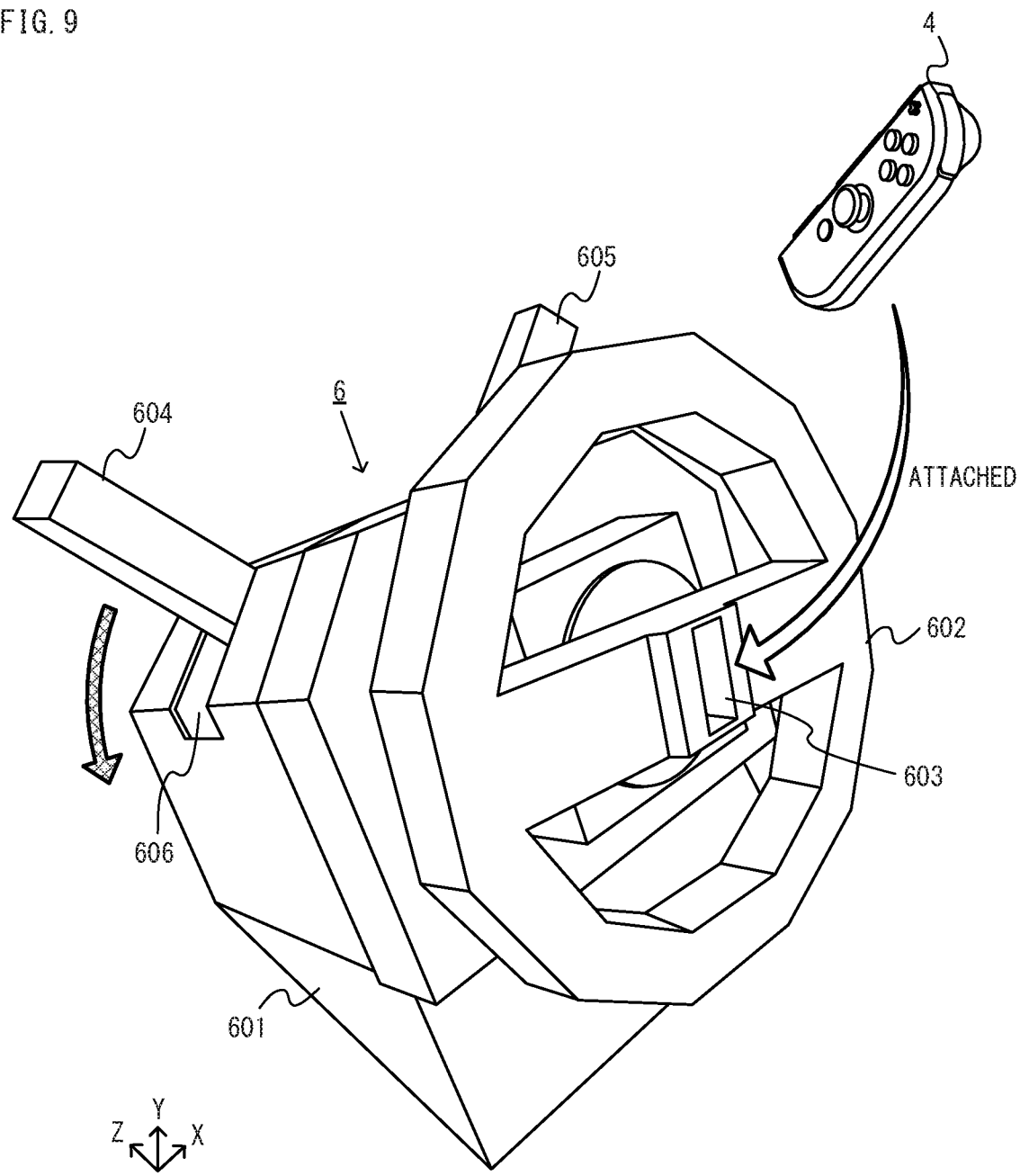
FIG. 9 is an illustration view showing a non-limiting example first additional operation apparatus and right controller.
Figure 10:
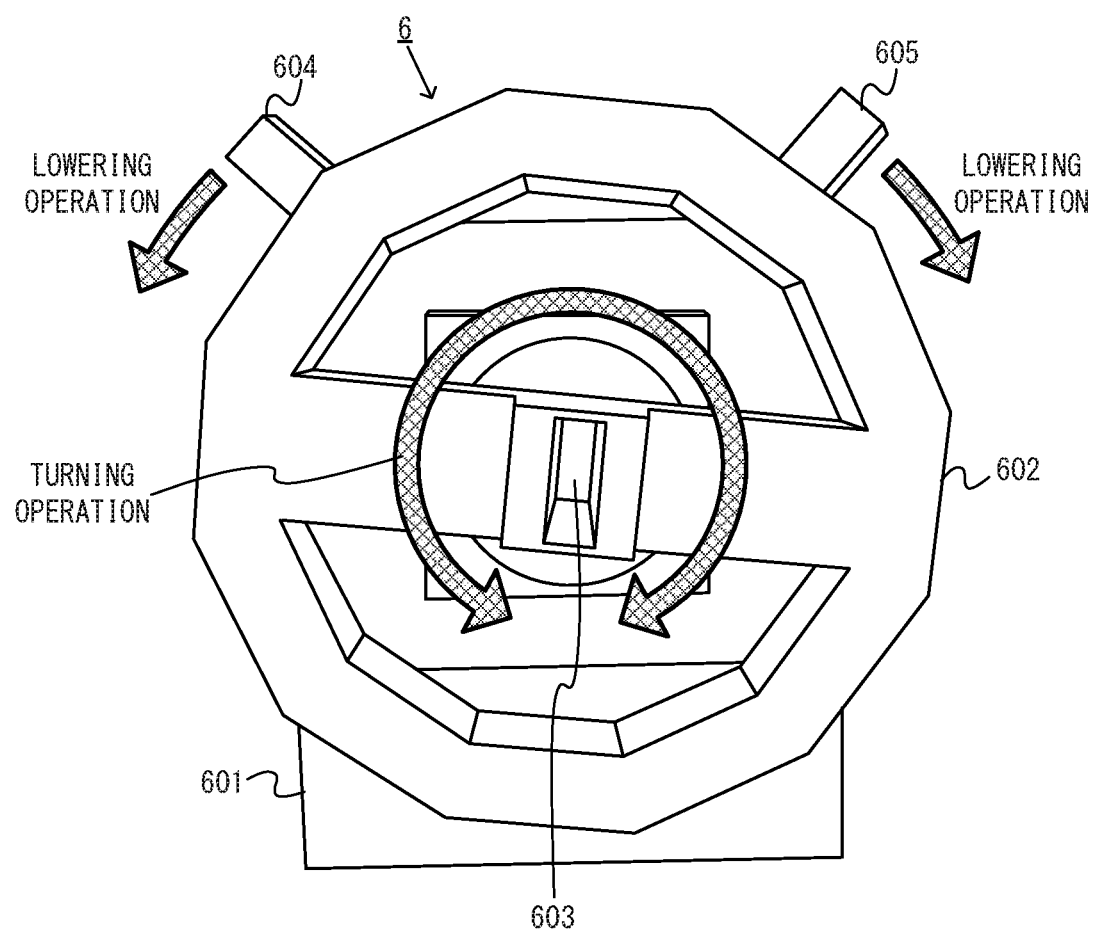
FIG. 10 is an illustration view showing a non-limiting example front view of the first additional operation apparatus shown in FIG. 9.

With reference to FIG. 9-FIG. 16, the first additional operation apparatus 6 and game processing of the individual game when the right controller 4 is attached to the first additional operation apparatus 6 will be described. FIG. 9 is an illustration view showing a non-limiting example first additional operation apparatus 6 and right controller 4. FIG. 10 is an illustration view showing the first additional operation apparatus 6 shown in FIG. 9 seen from the front side (that is, a negative direction side of a Z-axis shown in FIG. 9).

As shown in FIG. 9, the first additional operation apparatus 6 comprises a housing 601, a steering wheel 602, a left lever 604 and a right lever 605. The first additional operation apparatus 6 is an operation apparatus that the steering wheel 602 and respective levers 604 and 605 are operable. The first additional operation apparatus 6 is an operation apparatus imitating a steering wheel of a car, and is an operation apparatus for operating the car object 201 using the steering wheel 602 and the levers 604 and 605.

Here, although the material of the first additional operation apparatus 6 is arbitrary, in this embodiment, the material of each component (except a marker, described later) of the first additional operating device 6 is corrugated paper. Moreover, the first additional operation apparatus 6 may be provided to the user in a state before assembly so as to allow the user to assemble the first additional operation apparatus 6. Moreover, by allowing the user to assemble the first additional operation apparatus 6, it is possible to provide the user with enjoyment of assembling the operation apparatus used for the game. These can be also applied to the second additional operation apparatus 7 described later.

The steering wheel 602 shown in FIG. 9 is connected to the front surface (that is, a surface in a side of a negative direction of the Z-axis) of the housing 601. The steering wheel 602 is connected to the housing 601 in a turnable manner. Specifically, the steering wheel 602 has an annular portion having a donut shape, and a bar portion extended so as to connect opposite portions of the annular portion passing the center of the annular portion. The steering wheel 602 is turnable with respect to the housing 601 around the center of the annular portion as a turning axis. With the above-described configuration, the user can perform an operation of turning the steering wheel 602 (hereinafter, referred to as a "turning operation") (FIG. 10).

Moreover, in this embodiment, an insertion hole 603 is provided in a position of the turning axis of the steering wheel 602 in the above-described bar portion. The insertion hole 603 is provided so as to extend along the turning axis (in other words, along a direction perpendicular to a turning plane of the steering wheel). That is, the insertion hole 603 is extended in parallel with the direction perpendicular to the turning plane of the steering wheel 602. This insertion hole 603 is provided in order to attach the right controller 4. As shown in FIG. 9, the right controller 4 is inserted into the insertion hole 603, whereby the right controller 4 can be attached to the first additional operation apparatus 6.

In this embodiment, as described later, markers (612, 613, 614) provided within the housing 601 are imaged by the infrared imaging section 123, and the markers are detected from the imaged image, thereby determining the type of the additional operation apparatus, and determining the content of the operation (operation manner) by the user. Therefore, the user attaches the right controller 4 to the first additional operation apparatus 6 by inserting the right controller 4 into the insertion hole 603 from a side provided with the window portion 68 of the infrared imaging section 123.

Although illustration is omitted, a bottom surface against which the right controller 4 that is being inserted in the insertion hole 603 abuts is provided in a deeper portion of the insertion hole 603 in the bar portion. Therefore, the right controller 4 that is inserted in the insertion hole 603 is stopped because when the right controller 4 is inserted to a certain depth, the right controller 4 abuts the above-described bottom surface.

In addition, although illustration is omitted, in the above-described bottom surface provided in the deeper portion of the insertion hole 603, a hole is provided in a position corresponding to the window portion 68 of the right controller 4 having been attached to the first additional operation apparatus 6. Therefore, the infrared imaging section 123 of the right controller 4 having been attached to the first additional operation apparatus 6 can image an inside of the housing 601 through the hole of the above-described bottom surface.

Each of the levers 604 and 605 shown in FIG. 9 is provided to be protruded from each of side surfaces of the housing 601. Specifically, the left lever 604 is provided on the side surface at a left upper side of the housing 601 (that is, in FIG. 9, a negative direction side of the X-axis and a positive direction side of the Y-axis). The right lever 605 is provided on the side surface at a right upper side of the housing 601 (that is, in FIG. 9, a positive direction side of the X-axis and a positive direction side of the Y-axis). The left lever 604 and the right lever 605 are respectively connected to the housing 601 movably an up-down direction.

Figure 11:
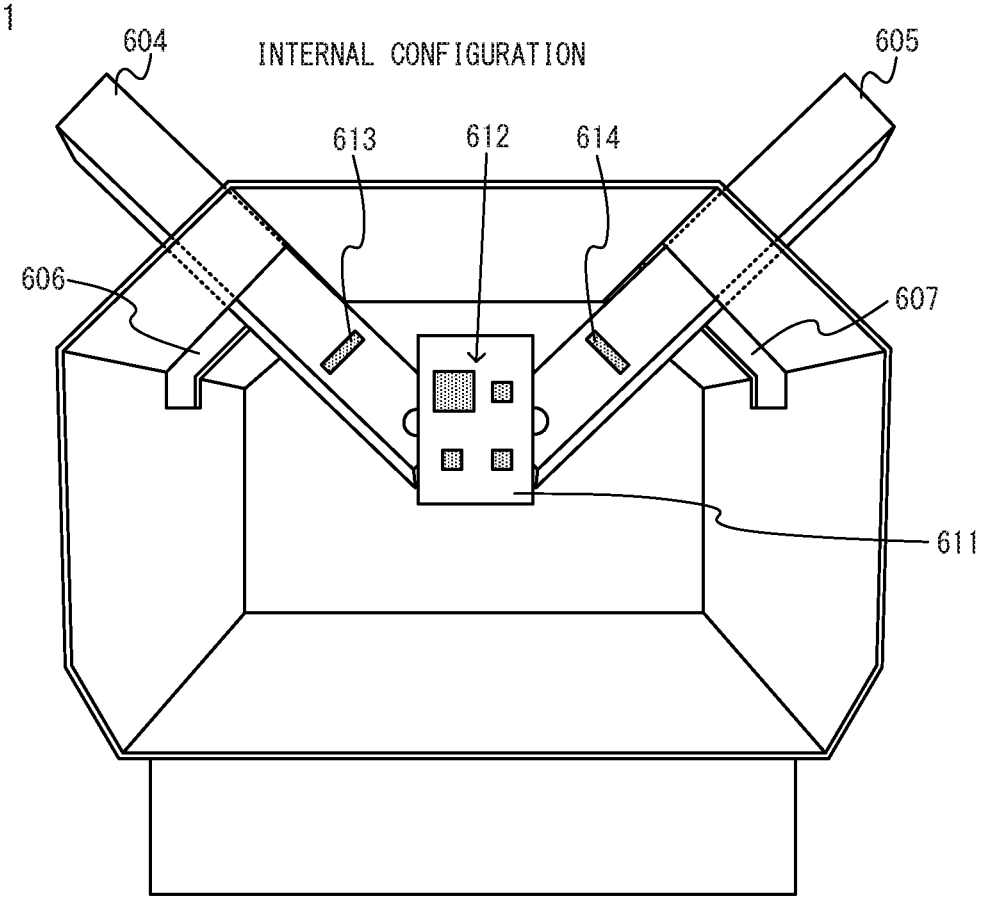
FIG. 11 is an illustration view showing a non-limiting example internal configuration of a housing of the first additional operation apparatus.

FIG. 11 is an illustration view showing a non-limiting example internal configuration of the housing 601. FIG. 11 is a view indicating the inside of the housing 601 by removing the front surface of the housing 601 (that is, a surface to which the steering wheel 602 is connected). As shown in FIG. 9 and FIG. 11, a left lever hole 606 is provided on the side surface in the left upper side of the housing 601. A right lever hole 607 is provided on the side surface in the right upper side of the housing 601. Each of the left lever 604 and the right lever 605 is formed in a bar shape. As shown in FIG. 11, one end of the left lever 604 is turnably connected to the housing 601 in the inside of the housing 601, and the other end of the left lever 604 is provided so as to be protruded outside the housing 601 through the left lever hole 606. Moreover, as shown in FIG. 11, one end of the right lever 605 is turnably connected to the housing 601 in the inside of the housing 601, and the other end of the right lever 605 is provided so as to be protruded outside the housing 601 through the right lever hole 607. In addition, a direction of each of turning axes of the left lever 604 and the right lever 605 is substantially the same as a direction of the turning axis of the steering wheel 602. That is, the directions of the turning axes of the steering wheel 602, the left lever 604 and the right lever 605 are in parallel with each other.

The left lever hole 606 is provided in a size that the left lever 604 can be turned. Therefore, the end of the left lever 604 protruded outside the housing 601 can be moved in the up-down direction as described above. Moreover, the right lever hole 607 is provided in a size that the right lever 605 can be turned. Therefore, the end of the right lever 605 protruded outside the housing 601 can be moved in the up-down direction as described above. Moreover, each of the left lever 604 and the right lever 605 is biased by a biasing member not shown so that its end protruded outside the housing 601 is moved upward. Therefore, in a state not operated by the user, as shown in FIG. 9 and FIG. 11, the left lever 604 is brought into contact with an upper side edge of the left lever hole 606 to be stopped, and the right lever 605 is brought into contact with an upper side edge of the right lever hole 607 to be stopped. By the configuration described above, the user can perform an operation that lowers the left lever 604 and/or the right lever 605 (hereinafter, referred to as a "lowering operation") (FIG. 10).

As described above, in this embodiment, the markers that can be imaged by the infrared imaging section 123 of the right controller 4 are provided in the inside of the first additional operation apparatus 6 and the second additional operation apparatus 7, respectively. In this embodiment, in the game system 1, the infrared imaging section 123 of the right controller 4 that is attached to the additional operation apparatus images the markers, and the markers are detected from an imaged image. Then, the game system 1 determines the type of the additional operation apparatus based on a detection result of the markers, or determines the content of the operation performed by the user to the additional operation apparatus. When the right controller 4 is attached to the first additional operation apparatus 6, the turning operation or the lowering operation is determined. In the following, determination processing using the markers will be described.

As shown in FIG. 11, inside the housing 601, a plane to be imaged 611 is provided in a position capable of being imaged by the infrared imaging section 123 of the right controller 4 attached to the first additional operation apparatus 6, i.e., within an imaging range of the infrared imaging section 123. A first basic marker 612 is provided in the plane to be imaged 611. In addition, in this specification, a marker used in order to determine the type of the additional operation apparatus to which the right controller 4 is attached is referred to as a "basic marker". A first basic marker 612 is a basic marker provided in the first additional operation apparatus 6, and is used in order to determine that the right controller 4 is attached to the first additional operation apparatus 6. That is, the first basic marker 612 is used in order to determine that the right controller 4 is in an attached state to the first additional operation apparatus 6, and to determine that the type of the additional operation apparatus to which the right controller 4 is attached is the first additional operation apparatus 6.

Here, the marker is configured by the material (and/or color) that the infrared imaging section 123 can distinguish the marker from other portions on an inside wall of the housing (that is, portions other than the marker). A marker may be a figure, a picture pattern drawn on the inner surface of the housing, or a combination of a figure and a picture pattern, or a part or component provided on an inner surface of the housing. Moreover, the marker may be configured by the material having a retroreflection property, for example. Moreover, instead of the material having the retroreflection property, it may adopt a configuration that the infrared light-emitting section 124 is provided inside the housing as the marker.

In this embodiment, the first basic marker 612 has a shape or form consists of four (4) square portions (FIG. 11). Moreover, in this embodiment, the four square portions are arranged in two rows vertically and horizontally. Although details will be described later, the basic markers provided in the first additional operation apparatus 6 and the basic marker of the second additional operation apparatus 7 have shapes different from each other. In the example shown in FIG. 11, the first basic marker 612 has a shape that one square portion out of the four square portions forming the first basic marker 612 is larger than remaining three square portions. Therefore, the game system 1 can determine that the right controller 4 is attached to the first additional operation apparatus 6 when the first basic marker 612 is detected in the image that is imaged by the infrared imaging section 123 of the right controller 4. In addition, in this specification, the "shape of the marker" is a concept including a size of the marker. That is, it can be said that two markers having different sizes have shapes different from each other.

In this embodiment, when the right controller 4 is attached to the additional operation apparatus by the user, and a switching operation such as the lowering operation (the depressing operation in case of the second additional operation apparatus 7) is performed by the user, the game system 1 (specifically, the processor 81) detects, in response to detection of this switching operation, that the right controller 4 is in the attached state to the additional operation apparatus, and determines the type of this additional operation apparatus. This is the same as when the right controller 4 is attached by the user to the second additional operation apparatus 7 described later. That is, in this embodiment, a fact that the right controller 4 is attached to the additional operation apparatus by the user does not become a trigger for the processor 81 to detect that the right controller 4 is in the attached state to the additional operation apparatus and to determine the type of this additional operation apparatus. A fact that the user indicates his/her intention to use the first additional operation apparatus 6 and second additional operation apparatus 7 by performing the switching operation after attaching the right controller 4 to the additional operation apparatus becomes a trigger for the processor 81 to detect that the right controller 4 is in the attached state to the additional operation apparatus and to determine the type of this additional operation apparatus. Moreover, according to a fact that the type of the additional operation apparatus to which the right controller 4 is attached is determined, the additional operation apparatus the user uses and a vehicle object corresponding to the additional operation apparatus are determined.

However, in other embodiments, using as a trigger a fact that the right controller 4 is attached to the additional operation apparatus by the user, the processor 81 may detect the right controller 4 is in the attached state to the additional operation apparatus, and determine the type of this additional operation apparatus.

That is, it may be detected that the right controller 4 is in an attached state to the additional operation apparatus when the right controller 4 is attached to the additional operation apparatus and any operation is further detected, or only when the right controller 4 is attached to the additional operation apparatus.

Moreover, in this embodiment, the first basic marker 612 is used in order to determine a turning operation to the steering wheel 602. In the following, a method of determining the turning operation will be described with reference to FIG. 12 and FIG. 13.

Figure 12:
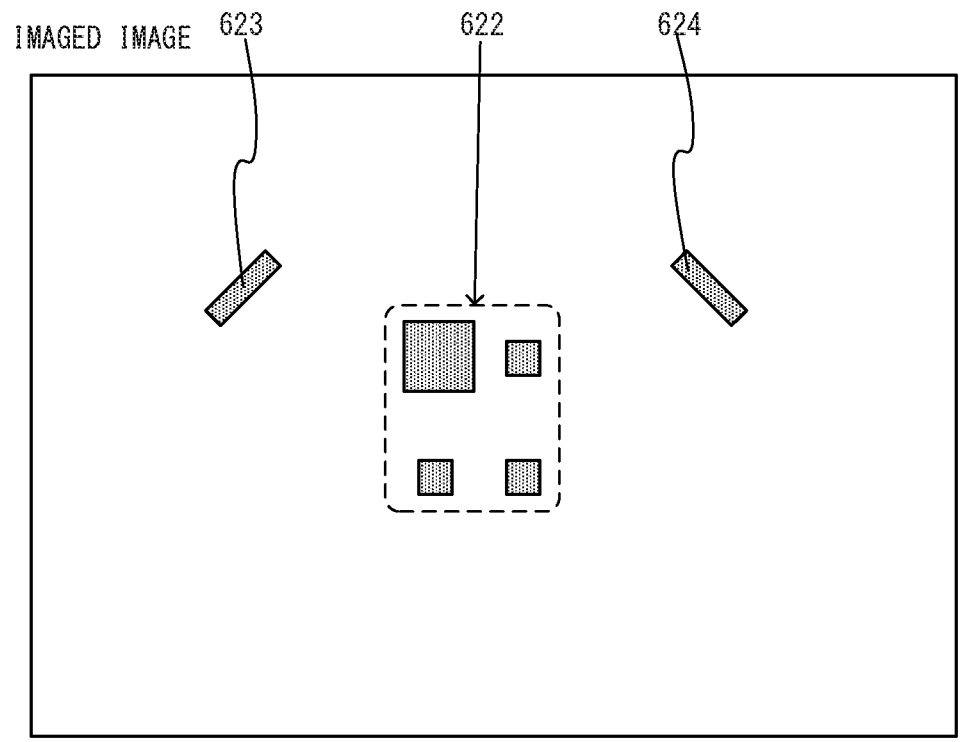
FIG. 12 is an illustration view showing a non-limiting example imaged image that is imaged by an infrared imaging section when a steering wheel of the first additional operation apparatus becomes in a reference state.
Figure 13:
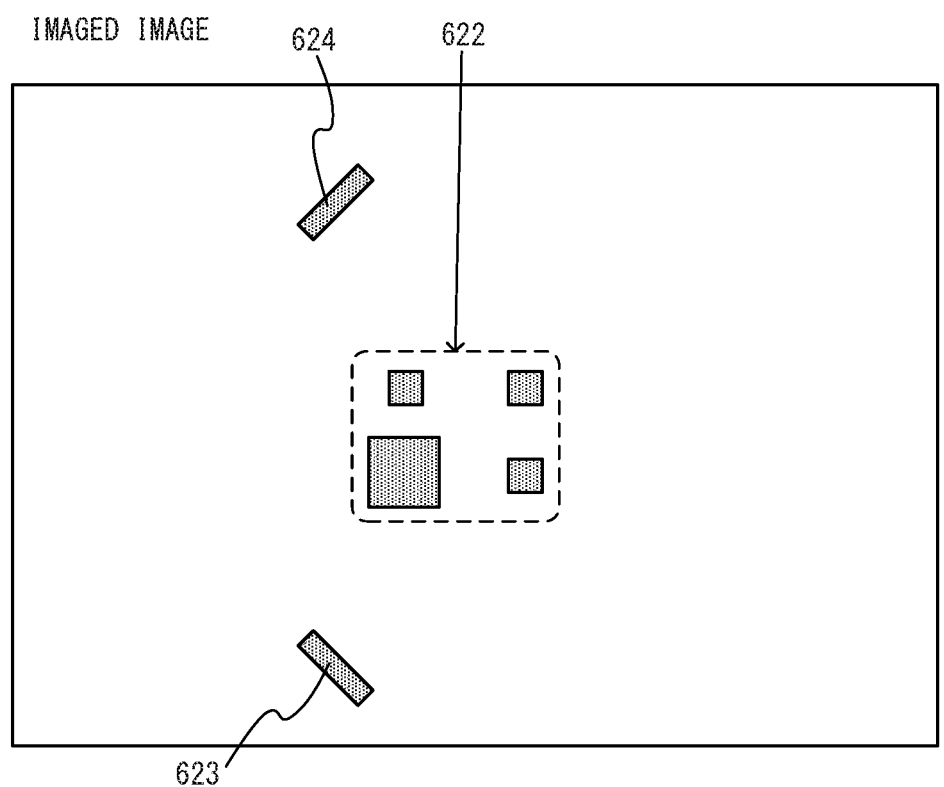
FIG. 13 is an illustration view showing a non-limiting example imaged image that is imaged by the infrared imaging section when the steering wheel of the first additional operation apparatus becomes in a turned state from the reference state.

FIG. 12 is an illustration view showing an example of an imaged image that is imaged by the infrared imaging section 123 when the steering wheel 602 of the first additional operation apparatus 6 is a reference state (specifically, a state where the bar portion is horizontal). FIG. 13 is an illustration view showing an example of an imaged image that is imaged by the infrared imaging section 123 when the steering wheel 602 of the first additional operation apparatus 6 is a turned state from the reference state. A first basic marker image 622 shown in FIG. 12 and FIG. 13 is an image indicating the first basic marker 612 in an imaged image.

If the steering wheel 602 is tuned by the turning operation, the right controller 4 attached to the steering wheel 602 is also turned. Therefore, according to a turning angle of the steering wheel 602, a direction of the first basic marker image 622 included in the imaged image is changed. Therefore, the game system 1 can calculate the turning angle of the steering wheel 602 based on the direction of the first basic marker image 622 in the imaged image, and can determine the turning operation based on the turning angle. Specifically, the game system 1 calculates a turning amount of the turning operation while determining whether the turning operation is performed. In the example shown in FIG. 12 and FIG. 13, for example, the first basic marker image 622 shown in FIG. 13 is arranged in a direction turned to the left 90 degrees on the basis of the first basic marker image 622 shown in FIG. 12. Therefore, the game system 1 can determine that the steering wheel 602 is in a state turned to the right 90 degrees from the reference state when the imaged image shown in FIG. 13 is acquired from the right controller 4.

As described above, the basic marker that is to be used in order to determine the type of the additional operation apparatus to which the right controller 4 is attached may be also used in order to determine the content (manner) of the operation to the additional operation apparatus.

As shown in FIG. 11, a left lever marker 613 is provided inside the housing 601 out of the left lever 604 and in a position capable of being imaged by the infrared imaging section 123 of the right controller 4 being attached to the first additional operation apparatus 6. The left lever marker 613 is used in order to determine an operation to the left lever 604. In the following, with reference to FIG. 11, FIG. 12, FIG. 14 and FIG. 15, a method of determining a lowering operation.

Figure 14:
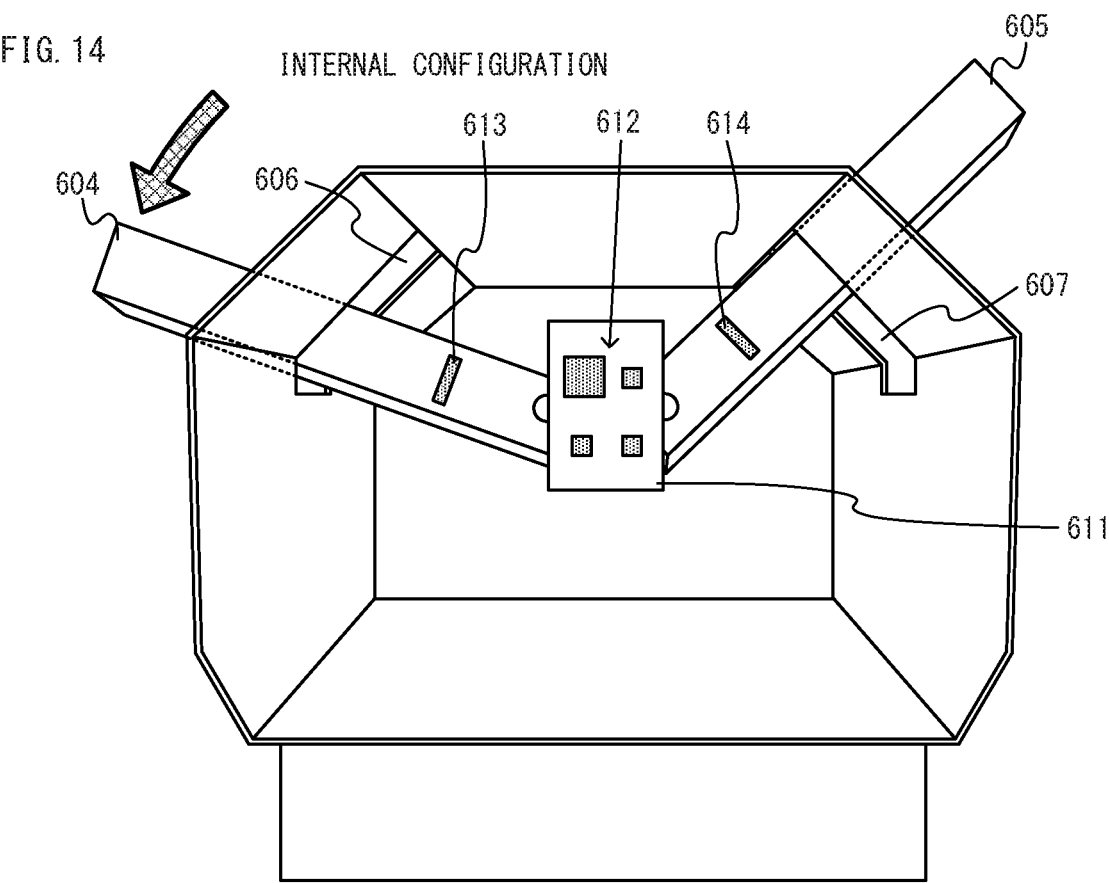
FIG. 14 is an illustration view showing a non-limiting example internal configuration of the housing of the first additional operation apparatus in a state where a lowering operation to a left lever is performed.
Figure 15:
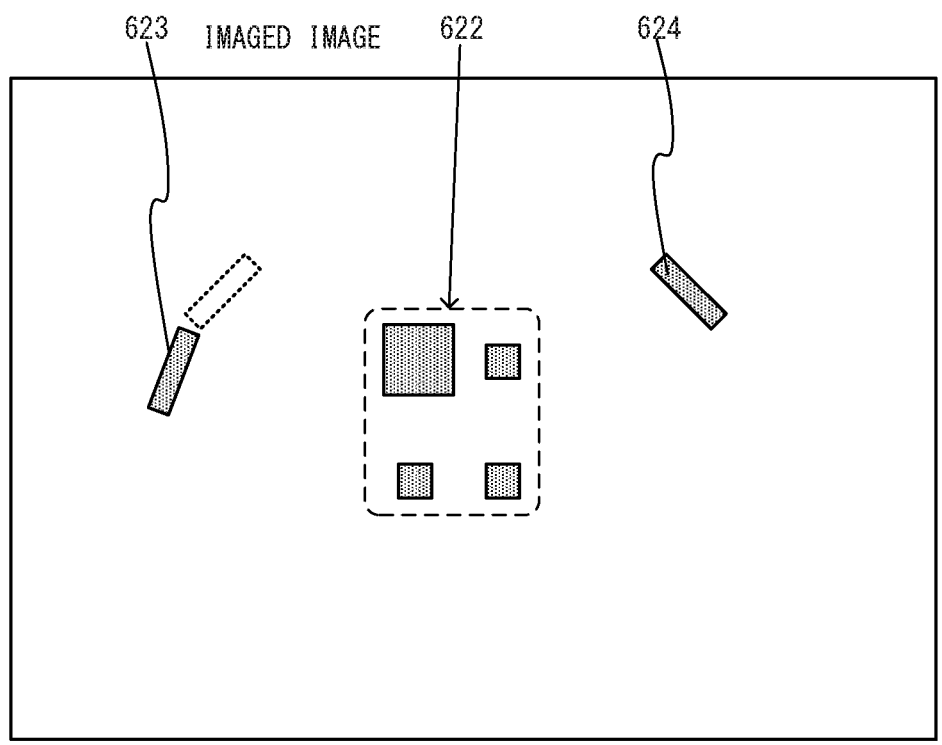
FIG. 15 is an illustration view showing a non-limiting example imaged image that is imaged by the infrared imaging section in a state where the lowering operation to the left lever of the first additional operation apparatus is performed.

FIG. 14 is an illustration view showing an example of the first additional operation apparatus 6 in a state where a lowering operation to the left lever 604 is performed. Moreover, FIG. 15 is an illustration view showing an example of an imaged image that is imaged by the infrared imaging section 123 in the state where the lowering operation to the left lever 604 is performed. In addition, the above-described FIG. 11 is an illustration view showing an example the first additional operation apparatus 6 in a state where the lowering operation to the left lever 604 is not performed, and FIG. 12 is an illustration view showing an imaged image that is imaged by the infrared imaging section 123 in that state. Moreover, the left lever marker image 623 shown in FIG. 12 and FIG. 15 is an image indicating the left lever marker 613 in the imaged image.

When the left lever 604 is moved downward by the lowering operation, a position and a direction of the left lever marker 613 seen from the infrared imaging section 123 of the right controller 4 that is attached to the first additional operation apparatus 6 are changed from a position and a direction of the left lever marker 613 in a state where the lowering operation to the left lever 604 is not performed. Therefore, the position and the direction of the left lever marker image 623 in an imaged image are changed between the state where the lowering operation to the left lever 604 is not performed (FIG. 12) and the lowering operation is performed (FIG. 15). Specifically, the position of the left lever marker image 623 in the state where the lowering operation to the left lever 604 is performed is moved to lower left compared with the position of the left lever marker image 623 in the state where the lowering operation to the left lever 604 is not performed. Therefore, when the imaged image shown in FIG. 15 is acquired from the right controller 4, the game system 1 can determine that the lowering operation to the left lever 604 is being performed.

However, in this embodiment, the right controller 4 attached to the first additional operation apparatus 6 is turned according to the turn of the steering wheel 602. Therefore, as the position and the direction of the left lever marker image 623 in the imaged image, the game system 1 calculates a position and a direction on the basis of the first basic marker image 622, and determines a lowering operation to the left lever 604 based on the position and the direction that are calculated. This is the same as when a lowering operation to the right lever 605 is to be determined.

Moreover, as shown in FIG. 11, a right lever marker 614 is provided in a position that becomes inside the housing 601 out of the right levers 605. The right lever marker 614 is used in order to determine an operation to the right lever 605. It is possible to perform determination of the lowering operation to the right lever 605 similarly to the determination of the lowering operation to the left lever 604. That is, the game system 1 calculates a position and a direction of the right lever marker image 624 in the imaged image, and determines a lowering operation to the right lever 605 based on the position and the direction that are calculated.

Figure 16:
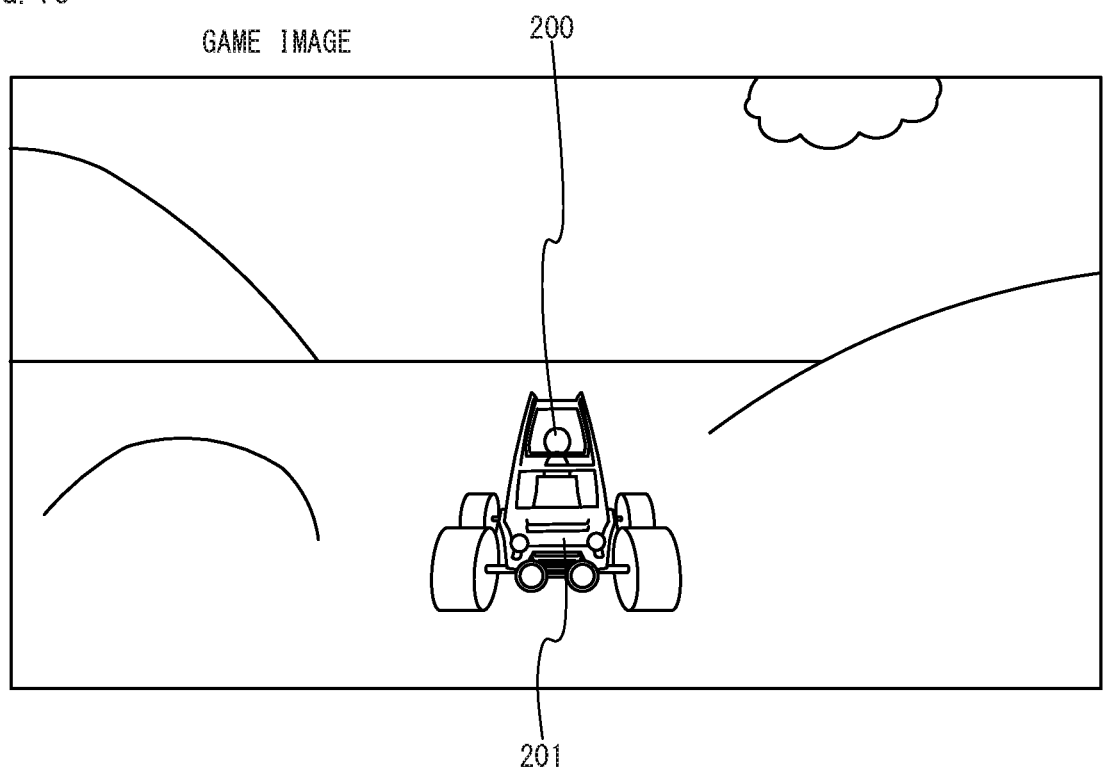
FIG. 16 is an illustration view showing a non-limiting example game image that is displayed when the right controller is attached to the first additional operation apparatus.

FIG. 16 is an illustration view showing a non-limiting example game image that is displayed when the right controller 4 is attached to the first additional operation apparatus 6. In an individual game, when the right controller 4 is attached to the first additional device 6, the game system 1 displays a game image representing a state where a player character 200 boards on a car object (hereinafter, referred to as a "game car object") 201 as shown in FIG. 16. In addition, in this embodiment, the above-described display 12 or a stationary monitor may be sufficient as a display on which the game image is to be displayed. This is the same also about a menu image described later.

Moreover, when the right controller 4 is attached to the first additional operation apparatus 6, the game system 1 determines the content of each operation to the first additional operation apparatus 6 (specifically, the turning operation and the lowering operation), and controls a motion of the game car object 201 according to these operations performed by the user. In addition, a method of controlling the operation of the game car object 201 according to the operation by the user is arbitrary. In this embodiment, the game system 1 controls a moving direction of the game car object 201 according to the turning operation to the steering wheel 602. When the right controller 4 is attached to the first additional operation apparatus 6, the turning operation is corresponding to a "direction designating operation". That is, if the turning operation to the steering wheel 602 is directed the left, the moving direction of the game car object 201 is changed to the left. Moreover, if the turning operation to the steering wheel 602 is directed the right, the moving direction of the game car object 201 is changed to the right. Therefore, for example, a course in the game space can be selected, or an item object to be acquired by the player character 200 can be selected from a plurality of item objects arranged in the game space. It does not need to be limited to the item object, and an object that can exhibit a certain function or effectiveness when selected by the player character 200 or the game car object 201 may be arranged in the game space.

Moreover, the game system 1 changes the gear of the game car object 201 according to the lowering operation to the left lever 604, and fires a bullet from the game car object 201 according to the lowering operation to the right lever 605. Therefore, for example, in the game space, a moving speed of the game car object 201 is increased or decreased, or the game car object 201 attacks an enemy object that interferes with movement, or destroys a rock object or a wall object etc. that block the course. In this embodiment, it is possible to set the moving speed to three different speeds, a low speed, a medium speed and a high speed, and at the time of a start of the individual game, the moving speed is set to the medium speed, and if the gear of the game car object 201 is changed according to the lowering operation of the left lever 604, the moving speed is changed so as to be increased. However, when being the high speed, the moving speed is set to the low speed. This is the same also about a change of a moving speed of a menu car object 201*a* described later.

As described above, according to determination that the right controller 4 is attached by the user to the first additional operation apparatus 6, it is possible to cause the game car object 201 to appear in the game space of the individual game and to play the individual game for operating the game car object 201.

Figure 17:
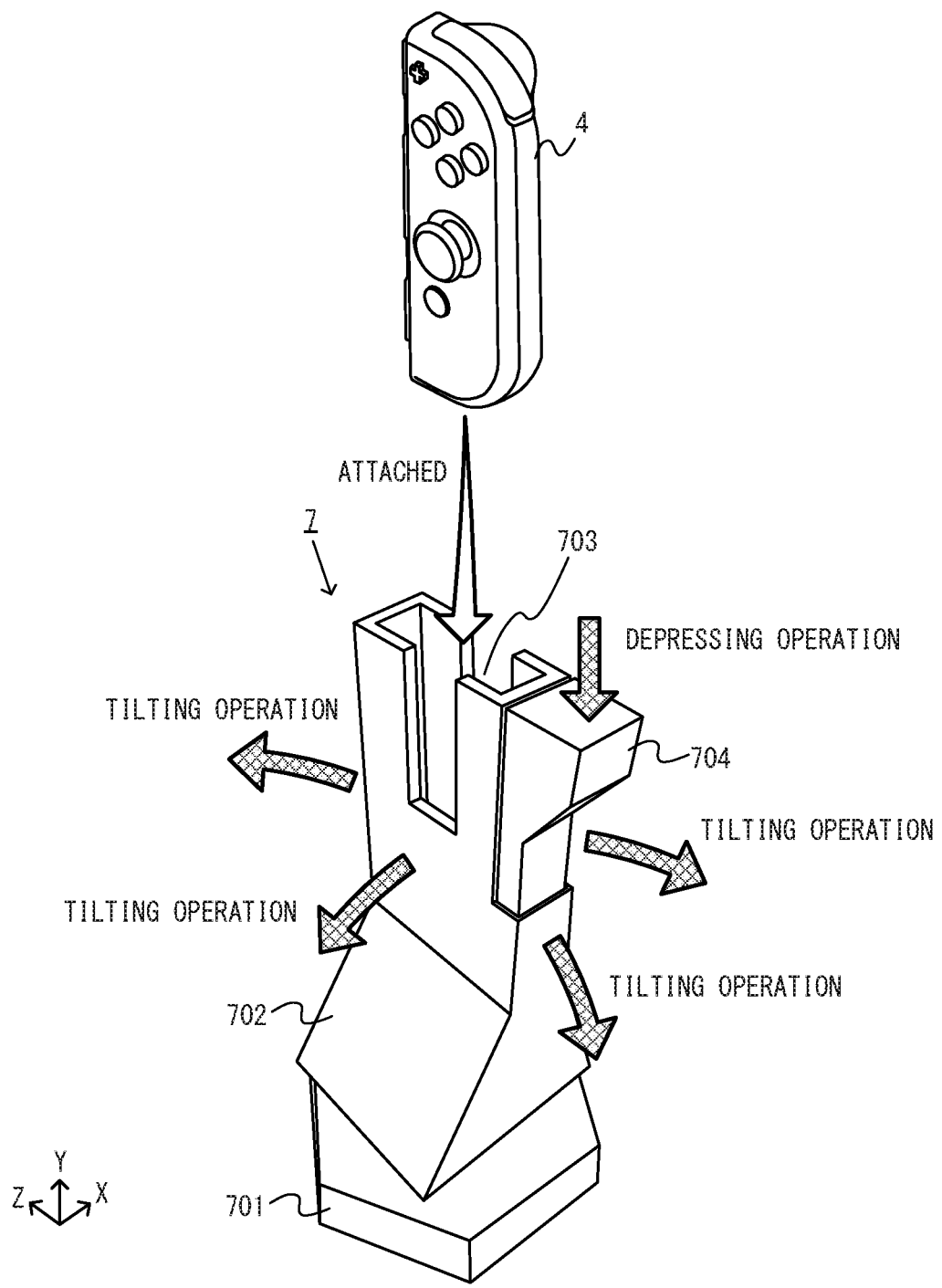
FIG. 17 is an illustration view showing a non-limiting example second additional operation apparatus and the right controller.
Figure 18:
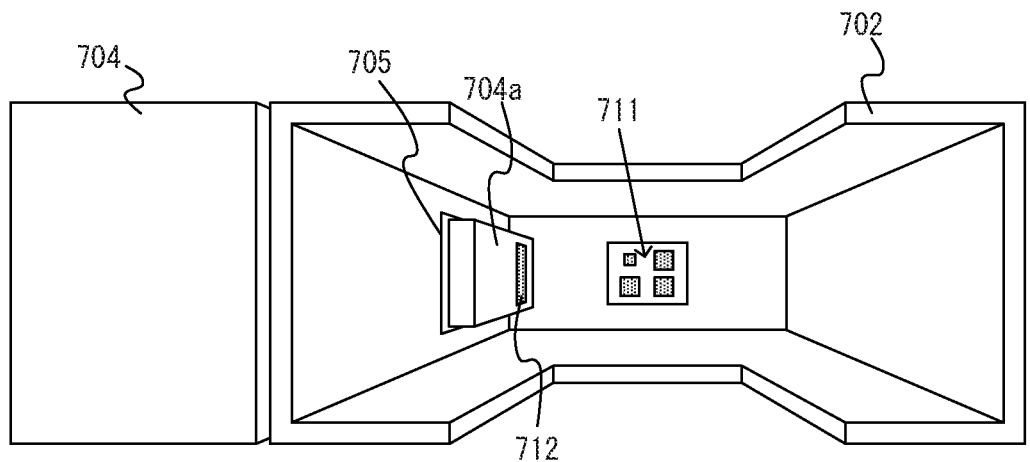
FIG. 18 is an illustration view showing a non-limiting example top view of the second additional operation apparatus shown in FIG. 17.

With reference to FIG. 17-FIG. 22, the second additional operation apparatus 7 and game processing of an individual game when the right controller 4 is attached to the second additional operation apparatus 7 will be described. FIG. 17 is an illustration view showing a non-limiting example second additional operation apparatus 7 and right controller 4. Moreover, FIG. 18 is an illustration view seeing the second additional operation apparatus 7 shown in FIG. 17 seen from the above (that is, a positive direction side of a Y-axis shown in FIG. 17).

As shown in FIG. 17, the second additional operation apparatus 7 comprises a pedestal portion 701, a grip portion 702 and a button 704. The second additional operation apparatus 7 is an operation apparatus that the grip portion 702 and the button 704 are operable. The second additional operation apparatus 7 is an operation apparatus imitating a control stick of an airplane, and is an operation apparatus for operating an airplane object (hereinafter, referred to as a "game airplane object") 202 using the grip portion 702 like the control stick.

The grip portion 702 is connected to the pedestal portion 701 in the second additional operation apparatus 7 shown in FIG. 17. The grip portion 702 can be tilted with respect to the pedestal portion 701. Although arrow marks of four directions of front and rear, right and left showing tiltable directions of the grip portion 702 are shown in FIG. 17, the grip portion 702 can be tilted in an arbitrary direction from a reference state where a longitudinal direction of the grip portion 702 is vertical.

As shown in FIG. 17, the grip portion 702 has an insertion hole 703 on its upper surface. The insertion hole 703 is provided so as to be extended along the longitudinal direction of the grip portion 702. The insertion hole 703 is provided in order to attach the right controller 4 thereto. Moreover, an upper portion of the grip portion 702 is formed as a cylindrical portion, and the right controller 4 can be inserted into the cylindrical portion. That is, as shown in FIG. 17, the right controller 4 is attached to the second additional operation apparatus 7 by inserting the right controller 4 into the insertion hole 703. As described above, since a marker is provided also inside the second additional operation apparatus 7, in this embodiment, a user attaches the right controller 4 to the second additional operation apparatus 7 by inserting the right controller 4 in the insertion hole 703 from a side provided with the window portion 68 of the infrared imaging section 123. Moreover, as shown in FIG. 17, a groove is provided in a side surface of the cylindrical portion. When the right controller 4 is inserted in the grip portion 702, the analog stick 52 is inserted along the above-described groove, and when the analog stick 52 abuts an end portion of the groove, insertion of the right controller 4 into the grip portion 702 is stopped.

As shown in FIG. 18, the insertion hole 703 of the grip portion 702 is communicated with a cavity inside the grip portion 702. Therefore, the infrared imaging section 123 of the right controller 4 that is inserted in the insertion hole 703 and attached to the grip portion 702 can image an inside of the grip portion 702.

As shown in FIG. 17, the button 704 is provided on the grip portion 702, and specifically, is provided on a side surface of the cylindrical portion of the grip portion 702. The button 704 is provided so as to be depressible from above. In addition, as shown in FIG. 18, a hole 705 is provided on a side surface that the button 704 is provided out of the above-described cylindrical portion of the grip portion 702. The button 704 is provided such that a part of the button 704 is protruded from the above-described hole 705 (FIG. 18).

Therefore, the above-described part of the button 704 can be imaged by the infrared imaging section 123 of the right controller 4 that is attached to the second additional operation apparatus 7.

With the above-described configuration, the user can perform an operation of tilting the grip portion 702 (hereinafter, referred to as a "tilting operation") and an operation of depressing the button 704 (hereinafter, referred to as a "depressing operation") (FIG. 17).

The second additional operation apparatus 7 is also provided with a marker capable of being imaged by the infrared imaging section 123 in the inside of the second additional operation apparatus 7, similar to the first additional operation apparatus 6. The game system 1 detects the marker from the imaged image that is imaged by the infrared imaging section 123 of the right controller 4 that is attached to the second additional operation apparatus 7. Then, based on a detection result of the marker, the game system 1 determines that the right controller 4 is attached to the second additional operation apparatus 7, or determines the content of an operation (specifically, depressing operation) performed to the second additional operation apparatus 7.

As shown in FIG. 18, a second basic marker 711 is provided in a bottom surface of the inside of the grip portion 702 in a position capable of being imaged by the infrared imaging section 123 of the right controller 4 that is attached to the second additional operation apparatus 7. Although a shape of the second basic marker 711 is arbitrary, the second basic marker 711 has a shape different from that of the above-described first basic marker 612. In an example shown in FIG. 18, the second basic marker 711 has a shape in which one square portion out of four square portions forming the second basic marker 711 is smaller than remaining three square portions.

As to the second additional operation apparatus 7, similar to the first additional operation apparatus 6, the game system 1 can determine the type of the additional operation apparatus to which the right controller 4 is attached, using the basic marker. The second basic marker 711 is a basic marker provided in the second additional operation apparatus 7, and is used in order to determine that the right controller 4 is attached to the second additional operation apparatus 7. That is, the second basic marker 711 is used in order to determine that the right controller 4 is in an attached state to the additional operation apparatus, and to determine the type of the additional operation apparatus to which the right controller 4 is attached is the second additional operation apparatus 7. However, the game system 1 detects the second basic marker 711 in the imaged image acquired from the right controller 4.

As shown in FIG. 18, the button 704 is provided with a button marker 712 in a position that can be imaged by the infrared imaging section 123 of the right controller 4 having been attached to the second additional operation apparatus 7. Specifically, the button marker 712 is provided in a portion protruded from the above-described hole 705 of the grip portion 702 out of the button 704. The button marker 712 is used in order to determine the depressing operation to the button 704.

Figure 19:
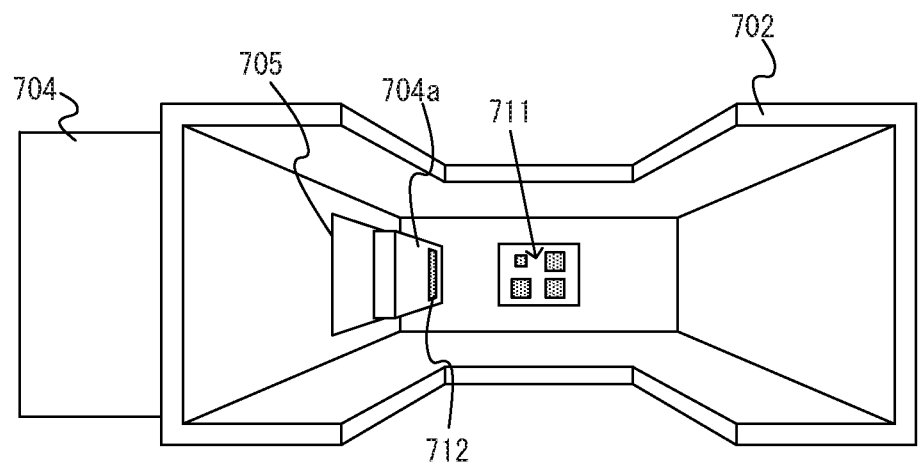
FIG. 19 is an illustration view showing a non-limiting example inside of a grip portion in a state where a button of the grip portion of the second additional operation apparatus is depressed.

FIG. 19 is an illustration view showing an example of the inside of the grip portion 702 in a state where the button 704 of the grip portion 702 is depressed. In addition, FIG. 18 is an illustration view showing an example of the inside the grip portion 702 in a state where the button of the grip portion 702 is not depressed. A position of the button marker 712 seen from the infrared imaging portion 123 of the right controller 4 that is attached to the second additional operation apparatus 7 differs between a state where the button 704 of the grip portion 702 is not depressed (FIG. 18) and a state where the button 704 of the grip portion 702 is depressed (FIG. 19). Specifically, the position of the button marker 712 in a state where the button 704 is depressed is moved to the right compared with the position of the button marker 712 in a state where the button 704 is not depressed (in other word, a direction approaching the second basic marker 711). Therefore, the game system 1 can determine that an operation to the button 704 is performed, based on the position of the image indicative of the button marker 712 in the imaged image that is imaged by the infrared imaging section 123 of the right controller 4 attached to the second additional operation apparatus 7.

Moreover, the tilting operation to the grip portion 702 is detected based on a detection result of the acceleration sensor 114 of the right controller 4. That is, the game system 1 calculates a posture or an orientation of the right controller 4 based on the acceleration detected by the acceleration sensor 114 that is provided on the right controller 4. Then, the game system 1 calculates, based on the calculated posture, a direction that the right controller 4 and the grip portion 702 are tilted with respect to the above-described reference state, and a tilting amount. Accordingly, the game system 1 can determine the tilting operation to the grip portion 702.

In addition, although the game system 1 determines the tilting operation to the grip portion 702 based on the detection result of the acceleration sensor 114 of the right controller 4 in this embodiment, the tilting operation may be detected based on the detection result of the angular velocity sensor 115 of the right controller 4 instead of the detection result of the acceleration sensor 114 or together with the detection result of the acceleration sensor 114.

As described above, the game system 1 may detect the operation to the additional operation apparatus using the marker, or may detect the operation using the operation data from the right controller 4 that is attached to the additional operation apparatus. Moreover, the game system 1 may detect the operation to the additional operation apparatus using both the marker and the operation data.

Figure 20:
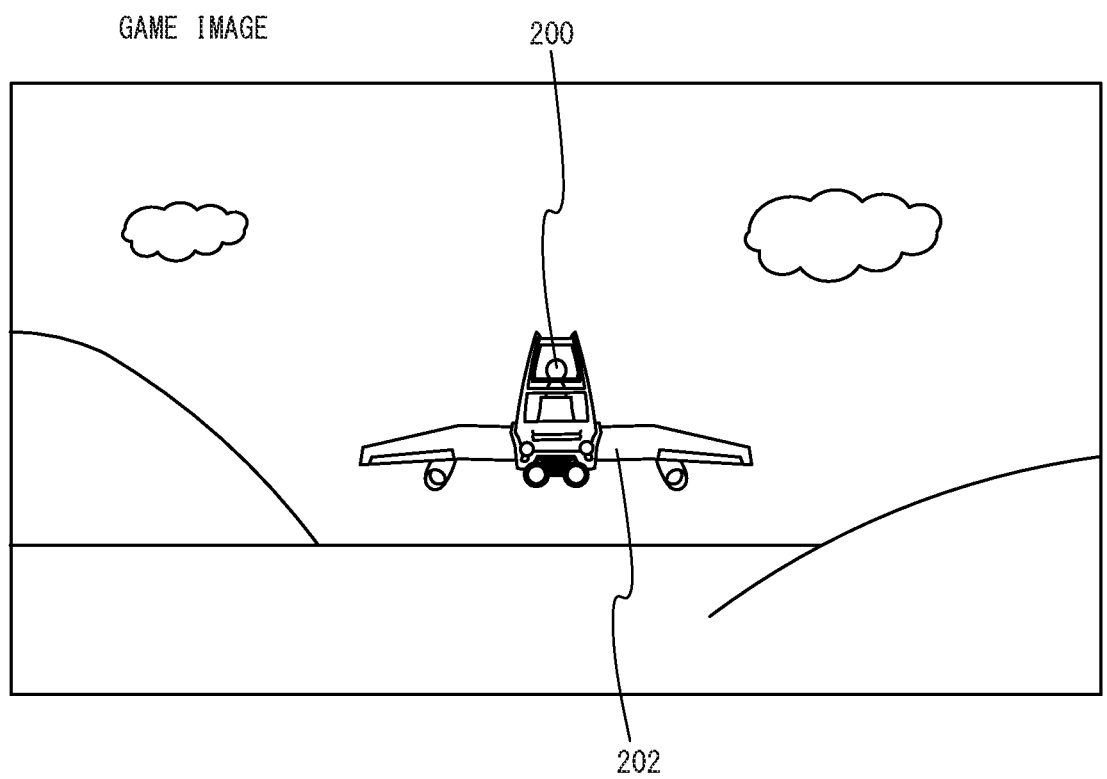
FIG. 20 is an illustration view showing a non-limiting example game image to be displayed when the right controller is attached to the second additional operation apparatus.

FIG. 20 is an illustration view showing an example of a game image to be displayed when the right controller 4 is attached to the second additional operation apparatus 7. In the individual game, when the right controller 4 is attached to the second additional operation apparatus 7 by the user and a switching operation is further performed by the user, the game system 1 determines, based on the imaged image acquired from the infrared imaging section 123 of the right controller 4, that the right controller 4 is attached to the second additional operation apparatus 7. At this time, the game system 1 displays a game image representing a state where the player character 200 boards on the game airplane object 202, as shown in FIG. 20.

Moreover, when it is determined that the right controller 4 is attached to the second additional operation apparatus 7, the game system 1 determines the content of the operation (specifically, tilting operation and depressing operation) to the second additional operation apparatus 7, and controls a motion of the game airplane object 202 according to the operation performed by the user. In addition, a method of controlling an operation of the game airplane object 202 according to the operation by the user is arbitrary.

For example, in this embodiment, the game system 1 controls a moving direction of the game airplane object 202 according to the tilting operation to the grip portion 702. When the right controller 4 is attached to the second additional operation apparatus 7, the tilting operation is corresponding to a "direction designating operation". As an example, if the tilting operation to the grip portion 702 is directed the left, the moving direction of the game airplane object 202 is changed to the left. Moreover, if the tilting operation to the grip portion 702 is directed the right, the moving direction of the game airplane object 202 is changed to the right. Therefore, for example, a moving direction in the game space is selected, or an item object to be acquired by the player character 200 is selected from a plurality of item objects arranged in the game space. It does not need to be limited to the item object, and an object that can exhibit a certain function or effectiveness when selected by the player character 200 or the game airplane object 202 may be arranged in the game space. Moreover, the game system 1 fires a bullet from the game airplane object 202 according to the depressing operation to the button 704. Therefore, for example, the game airplane object 202 attacks an enemy object existing in the game space.

As described above, when the user attaches the right controller 4 to the second additional operation apparatus 7, it is possible to cause the game airplane object 202 to appear in the game space of the individual game and to play the individual game for operating the game airplane object 202.

In the above-described game application, a plurality of different kinds of individual games are prepared, and the user can select the individual game the user wants to play in advance by a menu image. In this embodiment, the menu image is changed according to the attachment state of the right controller 4 to the additional operation apparatus.

Figure 21:
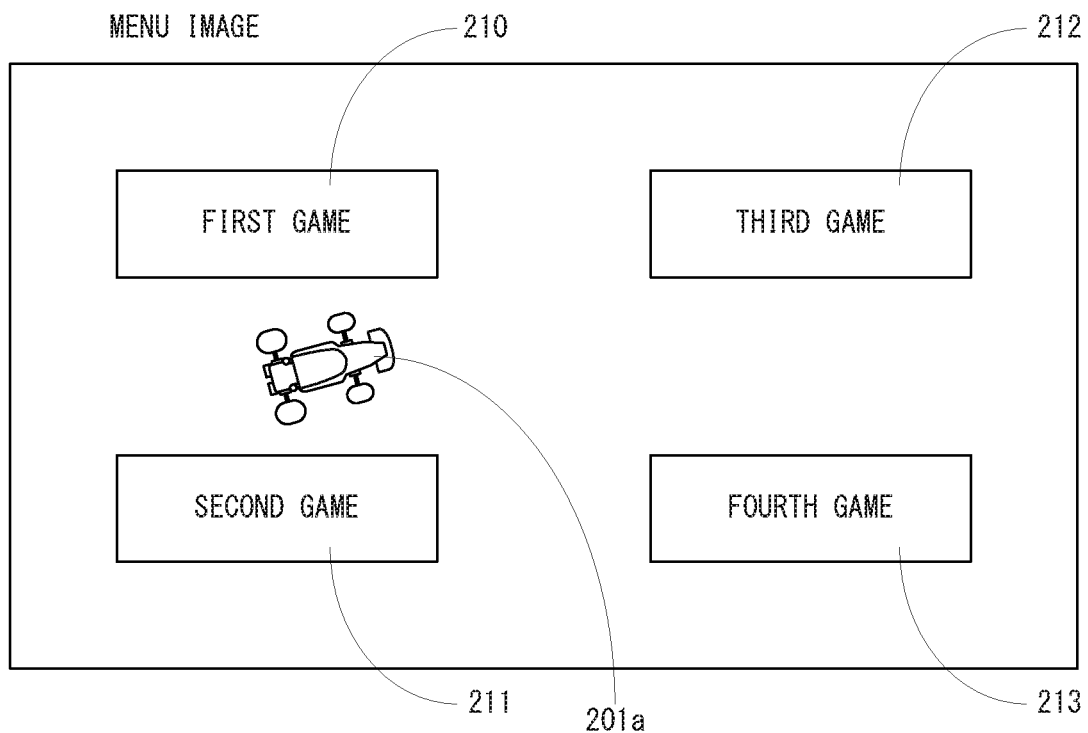
FIG. 21 is an illustration view showing a non-limiting example menu image to be displayed when the right controller is attached to the first additional operation apparatus.
Figure 22:
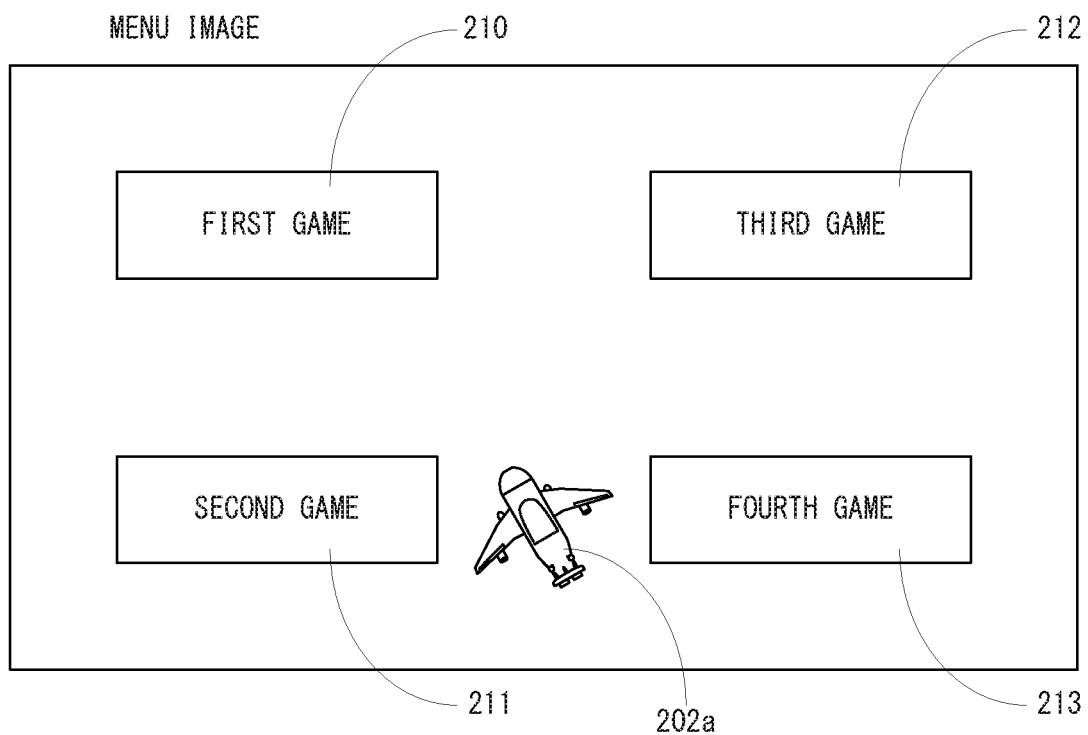
FIG. 22 is an illustration view showing a non-limiting example menu image to be displayed when the right controller is attached to the second additional operation apparatus.
Figure 23:
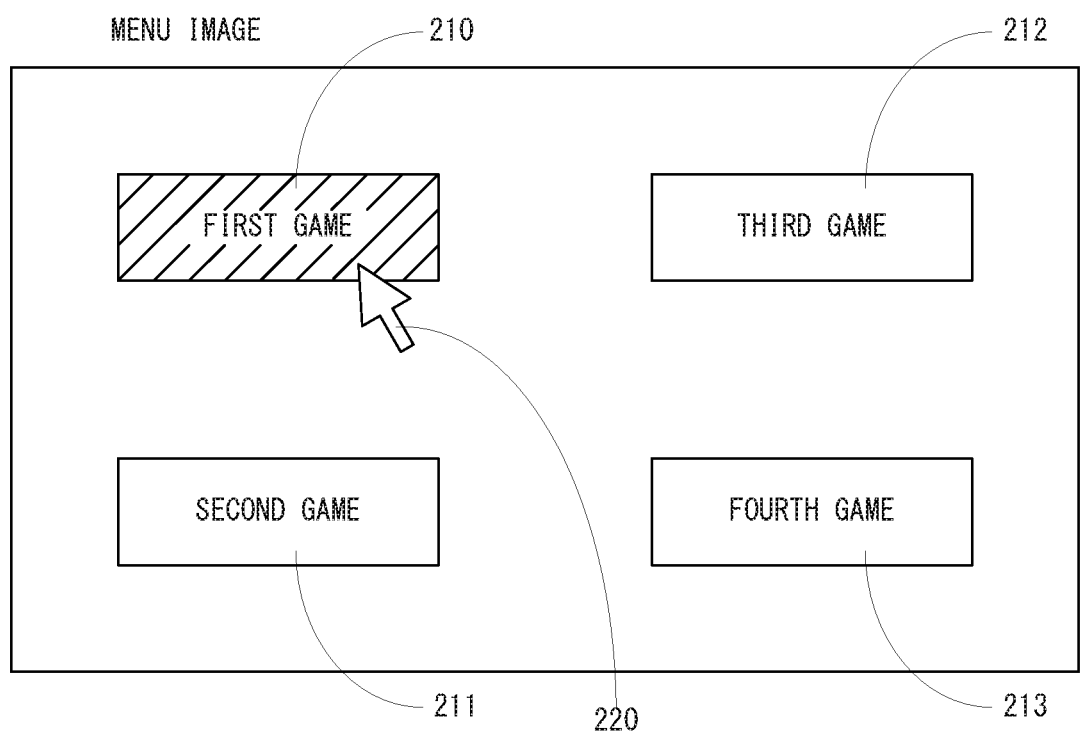
FIG. 23 is an illustration view showing a non-limiting example menu image to be displayed when the right controller is not attached to the additional operation apparatus.

FIG. 21 is an illustration view showing a non-limiting example menu image to be displayed in the first attached state where the right controller 4 is attached to the first additional operation apparatus 6. Moreover, FIG. 22 is an illustration view showing a non-limiting example menu image to be displayed in the second attached state where the right controller 4 is attached to the second additional operation apparatus 7. Furthermore, FIG. 23 is an illustration view showing a non-limiting example menu image to be displayed in the unattached state where the right controller 4 is not attached to the additional operation apparatus.

As shown in FIG. 21, an automobile (car) object (hereinafter, referred to as a "menu car object") 201a that functions as a designation image is displayed in the menu image in the first attached state. Moreover, a plurality of icons (in this embodiment, four) 210, 211, 212 and 213 for designating selection and performance (or start) of an individual game are displayed in the menu image in the first attached state. The menu car object 201a is a two-dimensional image obtained by simplifying the game car object 201 while seen from the above. That is, the menu car object 201a is related (approximated) in appearance to the game car object 201. This menu car object 201a can be operated similarly to a case where the game car object 201 is operated in the game processing of the individual game. That is, the game system 1 controls a moving direction of the menu car object 201a in the menu image in the first attached state according to the turning operation to the steering wheel 602. Therefore, if the turning operation to the steering wheel 602 is directed the left, the moving direction of the menu car object 201a is changed to the left. Moreover, if the turning operation to the steering wheel 602 is directed the right, the moving direction of the menu car object 201a is changed to the right. Therefore, for example, a course in the game space is selected and the menu car object 201a can be operated to move over the icon 210, 211, 212 or 213. When the menu car object 201*a* is moved over the icon 210, 211, 212 or 213, the icon 210, 211, 212 or 213 is selected.

Moreover, the game system 1 changes the gear of the menu car object 201*a* according to the lowering operation to the left lever 604, and fires a bullet from the menu car object 201 according to the lowering operation to the right lever 605. Therefore, for example, in the menu image, a moving speed of the menu car object 201*a* is increased or decreased. However, since an object other than icons 210-213 is not displayed in the menu image, a manner that the fired bullet is flying is displayed. Moreover, as described above, a method of changing the moving speed of the menu car object 201*a* is the same as that of the game car object 201.

As described above, since the menu car object 201*a* is related (approximated) in appearance to the game car object 201, the user can intuitively know that it is sufficient to operate the menu car object 201*a* by the same operation as that for the game car object 201. This is the same about operations of a game airplane object 202 and a menu airplane object 202*a* described later.

However, in a state where the icon 210, 211, 212 or 213 is selected, the selected icon 210, 211, 212 or 213 is turned on (or clicked) according to the lowering operation to the left lever 604 or the right lever 605, and therefore, the game system 1 can perform the individual game (a first game, a second game, a third game or a fourth game) corresponding to the turned-on icon 210, 211, 212 or 213. That is, game processing of the selected individual game is started.

Moreover, as shown in FIG. 22, in a menu image in the second attached state, an airplane object (referred to as the "menu airplane object") 202*a* that functions as a designation image is displayed. Moreover, the icons 210, 211, 212, and 213 are displayed in the menu image in the second attached state similarly to the menu image in the first attached state shown in FIG. 21. In this embodiment, the icons (or individual games) that can be selected by the menu image in the first attached state are the same as the icons (or individual games) that can be selected by the menu image in the second attached state; however, all or some individual games may differ. This is the same about a menu image in an unattached state described later.

The menu airplane object 202*a* is a two-dimensional image obtained by simplifying the game airplane object 202 while seen from the above. That is, the menu airplane object 202*a* is related (approximated) in appearance to the game airplane object 202. This menu airplane object 202*a* can be operated similarly to a case where the game airplane object 202 is operated in the game processing of the individual game. That is, in the menu image in the second attached state, the game system 1 controls a moving direction of the menu airplane object 202*a* according to the tilting operation to the grip portion 702. Therefore, if the tilting operation to the grip portion 702 is directed to the left, the moving direction of the menu airplane object 202*a* is changed to the left. Moreover, if the tilting operation to the grip portion 702 is directed to the right, the moving direction of the menu airplane object 202*a* is changed to the right. Therefore, for example, a moving direction in the game space is selected and the menu airplane object 202*a* can be operated so as to move over the icon 210, 211, 212 or 213. Moreover, the game system 1 fires a bullet from the menu airplane object 202*a* according to the depressing operation to the button 704. As described above, since an object other than icons 210-213 is not displayed in the menu image, a manner that the fired bullet is flying is displayed.

However, in a state where the icon 210, 211, 212 or 213 is selected, the selected icon 210, 211, 212 or 213 is turned on (or clicked) according to the depressing operation to the button 704, and therefore, the game system 1 can perform the individual game (a first game, a second game, a third game or a fourth game) corresponding to the turned-on icon 210, 211, 212 or 213. That is, game processing of the selected individual game is started.

Thus, in the first attached state or the second attached state, in the menu image, it is possible to perform the same operation to the menu car object 201*a* or the menu airplane object 202*a* as the operation to the game car object 201 or the game airplane object 202 in the individual game. Therefore, prior to playing the individual game, the operation method can be acquired and/or learned.

Moreover, also in the first attached state or the second attached state, the icon 210, 211, 212 or 213 is selected in the menu image, whereby the individual game (the first game, the second game, the third game or the fourth game) corresponding to the selected icon 210, 211, 212 or 213 can be played. That is, it is possible to perform selecting and performing the individual game by operating the additional operation apparatus to which the right controller 4 is attached. Therefore, in a case where a certain individual game is played, and then, a further individual game is to be selected and performed, even if an operation target is changed to a menu vehicle object (the menu car object 201*a* or the menu airplane object 202*a*) from a game vehicle object (the game car object 201 or the game airplane object 202), the further individual game can be selected by operating the menu vehicle object with operational feeling similar to that of the game vehicle object. Moreover, it is not necessary to take out the right controller 4 from the additional operation apparatus or switch to another controller (for example, the left controller 3), and playing the individual game, and selecting and performing the menu (or individual game) can be performed seamlessly.

However, as shown in FIG. 23, a designation image 220 is displayed in the menu image in an unattached state. Moreover, in the menu image in the unattached state, similar to the menu image shown in FIG. 21 and FIG. 22, the icons 210, 211, 212 and 213 are displayed.

The designation image 220 is a two-dimensional image like a mouse pointer. As for the game system 1, according to an operation of the analog stick 52 of the right controller 4, the designation image 220 is moved in the up-down and left-right directions and diagonal directions. However, the designation image 220 is moved between the icons 210, 211, 212 and 213. Therefore, the designation image 220 is moved so as to be overlapped with the icons 210, 211, 212 or 213. In the example shown in FIG. 23, the menu image that is in a state where the icon 210 is selected by the designation image 220 is displayed. Moreover, in the game system 1, the selected icon 210, 211, 212 or 213 is turned on (clicked) according to an operation of the A button 53, and the individual game (a first game, a second game, a third game or a fourth game) corresponding to the turned-on icon 210, 211, 212 or 213 is performed. In this case, after the individual game is started, the right controller 4 is attached to the additional operation apparatus, and the individual game is played.

However, when the menu image in the unattached state is displayed, if the user attaches the right controller 4 to the additional operation apparatus and performs the lowering operation or the depressing operation, the type of the additional operation apparatus to which the right controller 4 is attached is determined, and thus, the menu image of the first attached state or the second attached state is displayed according to the determined type. At this time, since the menu car object 201a or the menu airplane object 202a is displayed instead of the designation image 220, it is possible to know at a glance that it becomes operable by the additional operation apparatus. Moreover, if the user detaches the right controller 4 from the additional operation apparatus when the menu image in the first attached state or the second attached state is being displayed, the menu image in the unattached state is displayed.

In addition, although different designation images in the first attached state, the second attached state and the unattached state are displayed, respectively in this embodiment, the same designation image may be displayed in all the states. However, also in such a case, the designation image is moved similar to the game object in the first attached state and the second attached state.

Moreover, in this embodiment, although illustration is omitted, an icon for returning to a home screen is also displayed in the menu image. If this icon is selected and turned on (or clicked), the home image is displayed on the display. It is possible to select ending the game application in this home image.

Figure 24:
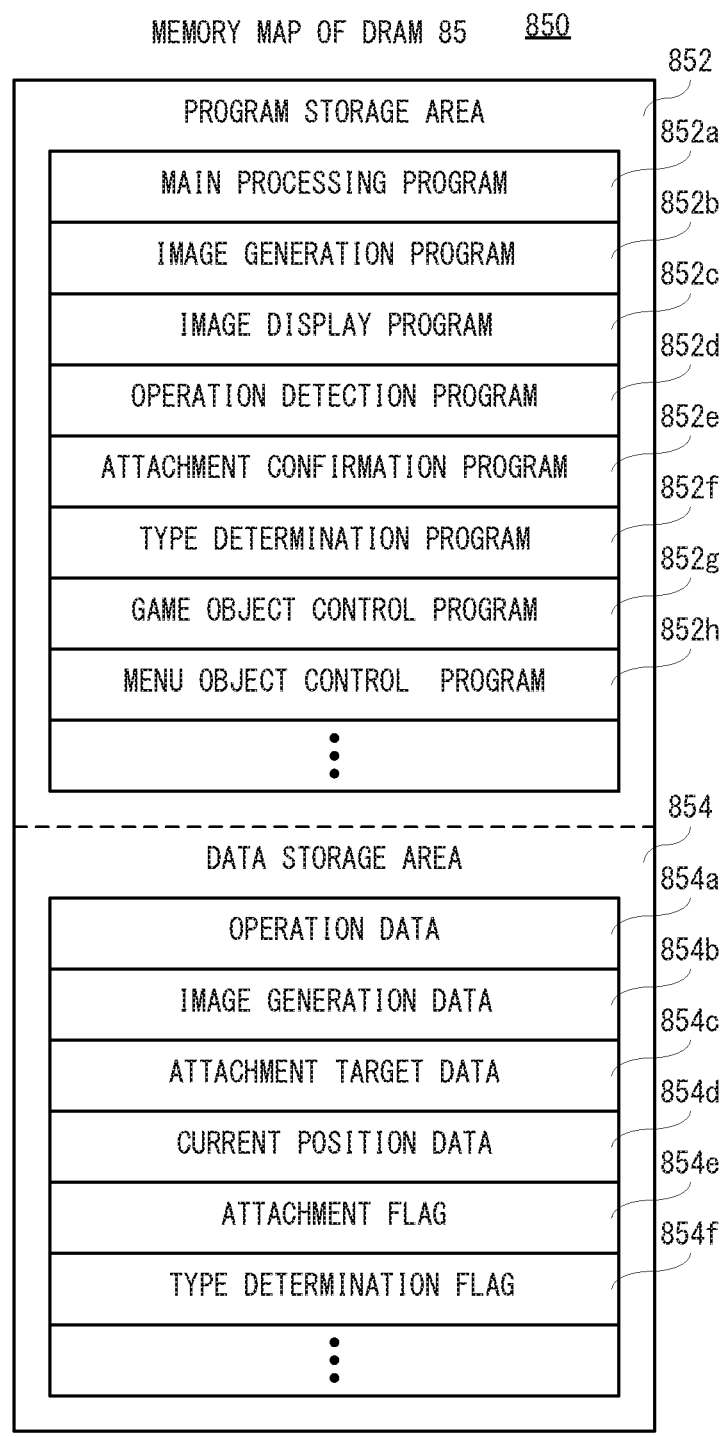
FIG. 24 is an illustration view showing a non-limiting example memory map of a DRAM of the main body apparatus shown in FIG. 6.

FIG. 24 is an illustration showing a non-limiting example memory map 850 of the DRAM 85 shown in FIG. 6. As shown in FIG. 24, the DRAM 85 includes a program storage area 852 and a data storage area 854. The program storage area 852 is stored with a program of a game application (i.e., game program). As shown in FIG. 24, the game program includes a main processing program 852a, an image generation program 852b, an image display program 852c, an operation detection program 852d, an attachment confirmation program 852e, a type determination program 852f, a game object control program 852g, a menu object control program 852h, etc.

Although detailed description is omitted, at a proper timing after the power of the main body apparatus 2 is turned on, a part or all of each of the programs 852a-852h is read from the flash memory 84 and/or a storage medium attached to the slot 23 so as to be stored in the DRAM 85. However, a part or all of each of the programs 852a-852h may be acquired from other computers capable of performing communication with the main body apparatus 2.

The main processing program 852a is a program for performing overall game processing. The image generation program 852b is a program for generating display image data corresponding to various kinds of images, such as a menu image and a game image, using image generation data 854b described later. The image display program 852c is a program for outputting the display image data generated according to the image generation program 852b to the display. Therefore, images corresponding to the display image data can be displayed on a display device such as the display 12.

The operation detection program 852d is a program for receiving the operation data 854a from the controllers. The attachment confirmation program 852e is a program for confirming whether the right controller 4 is attached to the additional operation apparatus. The type determination program 852f is a program for determining the type of the additional operation apparatus to which the right controller 4 is attached according to having determined that the lowering operation or the depressing operation is performed. Although the type of the additional operation apparatus to which the right controller 4 is attached is determined according to having determined that the lowering operation or the depressing operation is performed in this embodiment, instead of these operations or together with these operations, the type of the additional operation apparatus to which the right controller 4 is attached may be determined according to having determined that the turning operation or the tiling operation.

The game object control program 852g is a program for controlling a motion of the game object according to an operation of the user. However, the game object means the game car object 201 or the game airplane object 202. The menu object control program 852h is a program for controlling a motion of the menu object according to an operation of the user. Moreover, the menu object means the menu car object 201a or the menu airplane object 202a. However, the menu object control program 852h is also a program for controlling movement of the designation image 220 according to an operation of the user.

In addition, the program storage area 852 is further stored with a sound output program for outputting a sound such as a BGM, a communication program for performing communication with other apparatuses, a backup program for storing data in a nonvolatile storage medium such as the flash memory 84, etc.

Moreover, the data storage area 854 is stored with operation data 854a, image generation data 854b, attachment target data 854c, current position data 854d, etc. Moreover, an attachment flag 854e, a type determination flag 854f, etc. are provided in the data storage area 854.

The operation data 854a is operation data received from the controllers. In this embodiment, the operation data 854a includes data of the imaged image by the infrared imaging section 123. In addition, in other embodiments, the operation data 854a may include information obtained by applying some processing to the imaged image and/or information obtained from the imaged image (for example, information indicative of a position and a direction of the marker). Moreover, when the main body apparatus 2 receives operation data from a plurality of controllers, the main body apparatus 2 stores the operation data 854a for each of the controllers.

The image generation data 854b is data required for generating the display image data, such as polygon data and texture data. The attachment target data 854c is data about identification information indicative of the type of the additional operation apparatus to which the right controller 4 is attached. However, when the right controller 4 is not attached to the additional operation apparatus, the attachment target data 854c is not stored. Otherwise, null data is stored as the attachment target data 854c. The current position data 854d is position data about a current position of the game object in the game space, the menu object in the game space or the designation image 220 in the game space.

The attachment flag 854e is a flag for determining whether the right controller 4 is attached to the additional operation apparatus, and the attachment flag 854e is turned on when it is determined that the right controller 4 is in an attached state, and turned off when it is determined that the right controller 4 is in an unattached state. The type determination flag 854f is a flag for determining whether the type of the additional operation apparatus to which the right controller 4 is attached (or attachment target) is determined, and the type determination flag 854f is turned on when the type of the additional operation apparatus is determined, and turned off when the type of the additional operation device is not determined.

In addition, in this embodiment, the type of the additional operation apparatus is determined on the assumption that the right controller 4 is attached to the additional operation apparatus. Therefore, when the right controller 4 is in the attached state to the additional operation apparatus, the type determination flag 854*f* and the attachment flag 854*e* are both turned on, and the type determination flag 854*f* and the attachment flag 854*e* are both turned off when the right controller 4 is in the unattached state where the right controller 4 is unattached to the additional operation apparatus.

Although illustration is omitted, the data storage area 854 is stored with other data, and provided with other flags and counters (timers).

Figure 25:
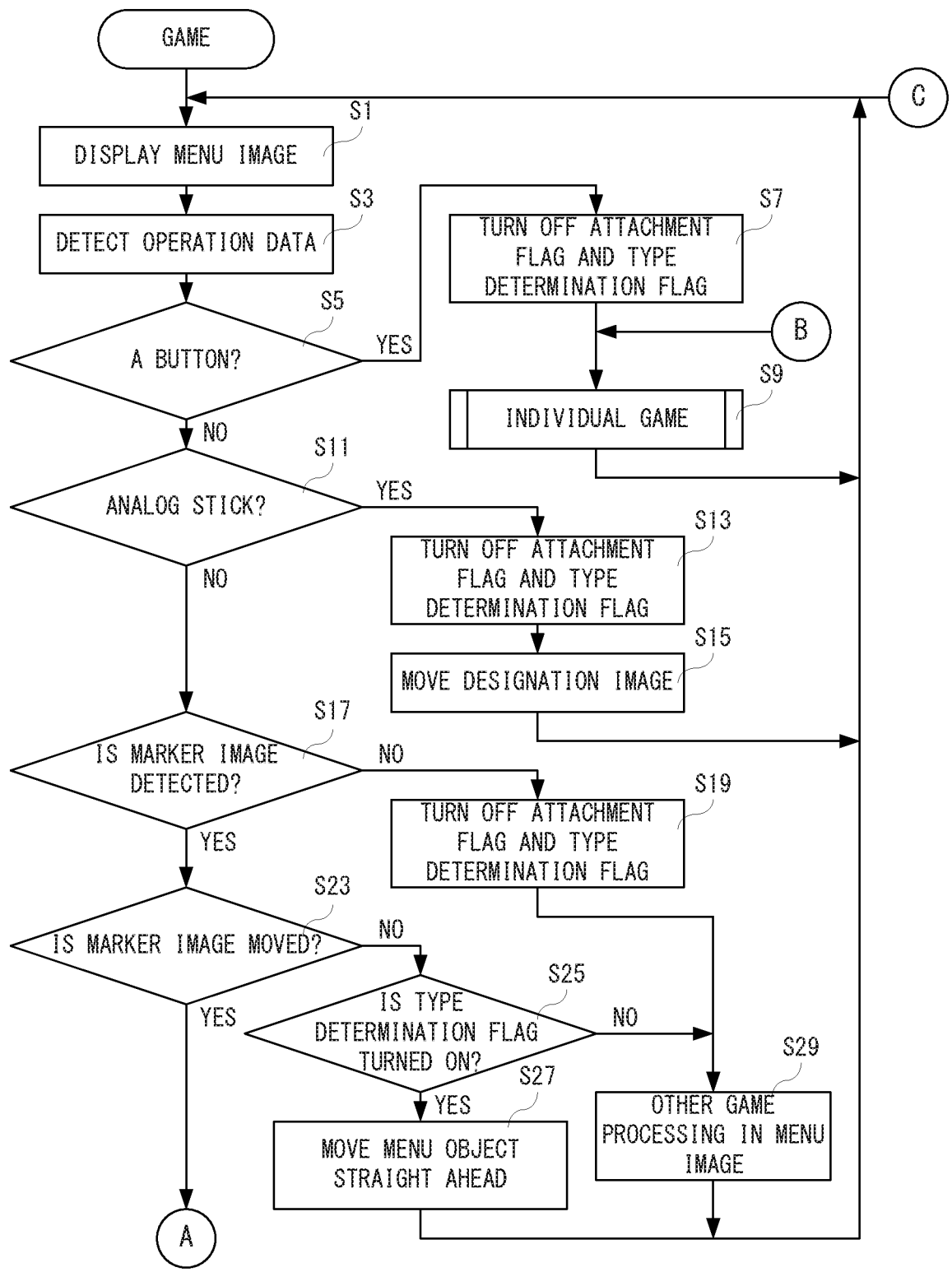
FIG. 25 is a flowchart showing a part of non-limiting example overall game processing by a processor(s) of the main body apparatus shown in FIG. 6.
Figure 26:
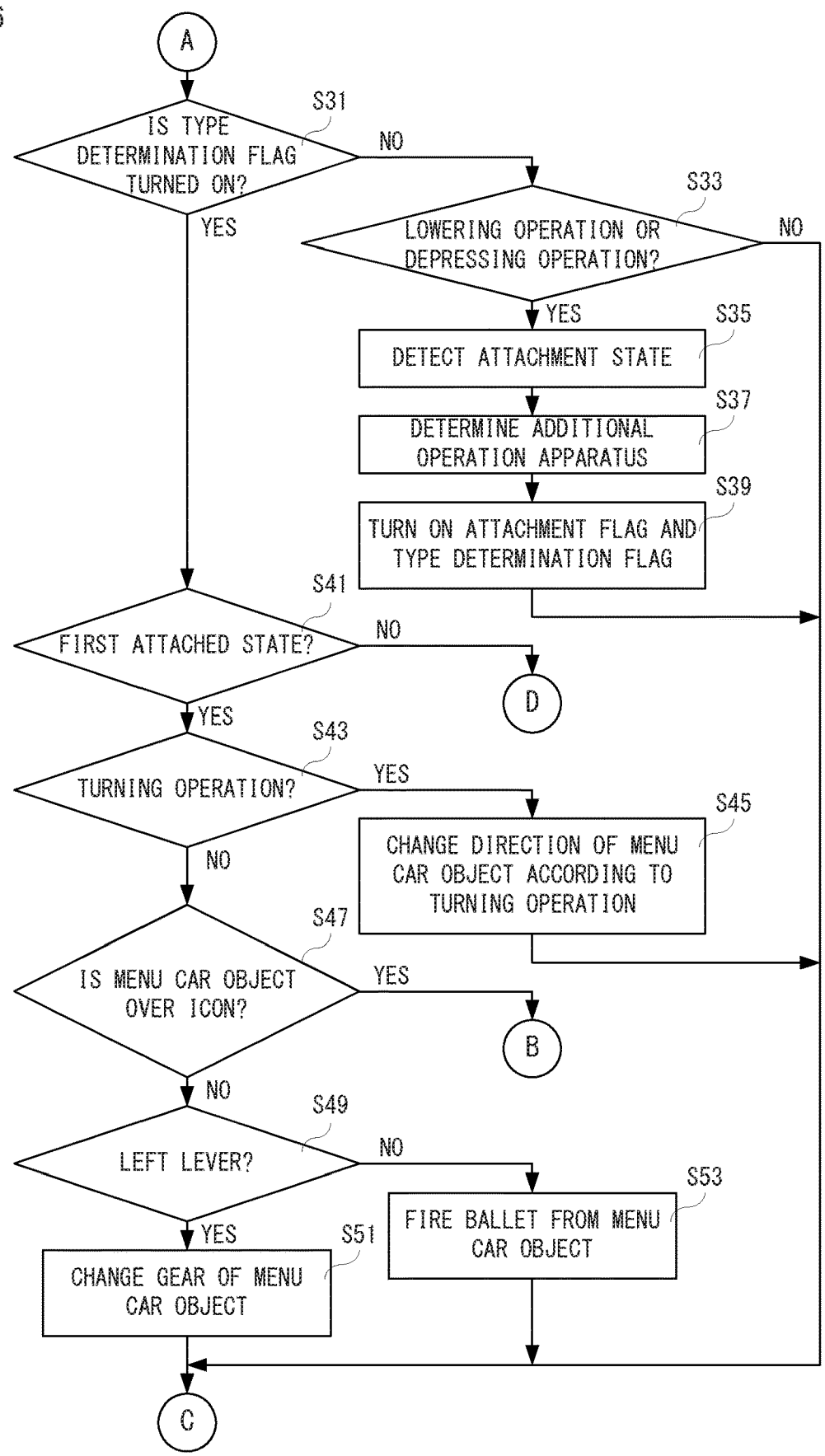
FIG. 26 is a flowchart showing another part of the non-limiting example overall game processing of the processor(s) by the main body apparatus shown in FIG. 6, following FIG. 25.
Figure 27:
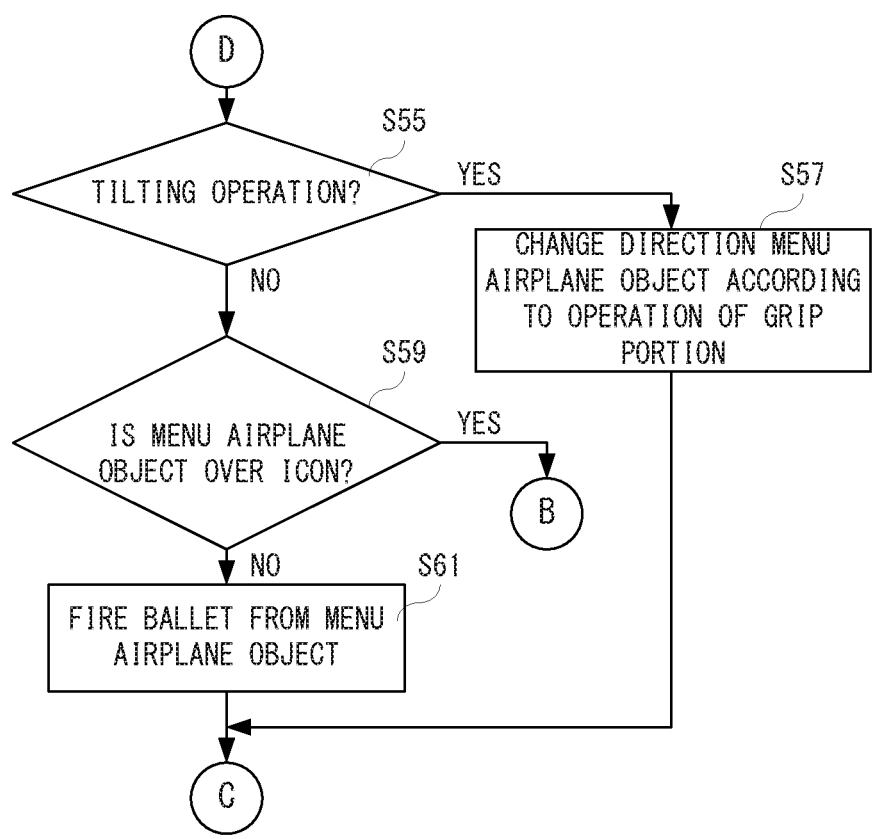
FIG. 27 is a flowchart showing the other part of the non-limiting example overall game processing of the processor(s) by the main body apparatus shown in FIG. 6, following FIG. 26.

FIG. 25-FIG. 27 are flowcharts showing non-limiting example processing of the game program (the overall game processing) by the processor 81 (or computer) of the main body apparatus 2. However, processing of respective steps of the flowcharts of FIG. 25-FIG. 27 (also processing of the individual game in FIG. 28-FIG. 30 described later) are mere examples, and if the same or similar result is obtainable, an order of the respective steps may be exchanged. Moreover, in this embodiment, basically, it is determined that the processor 81 performs the processing of each step of the flowcharts shown in FIG. 25-FIG. 30; however, some steps may be performed by a processor(s) and/or a dedicated circuit(s) other than the processor 81.

If the power of the main body apparatus 2 is turned on, prior to performing the overall game processing, the processor 81 executes a boot program stored in a boot ROM not shown, whereby respective units such as the DRAM 85 are initialized. The main body apparatus 2 starts the overall game processing when the user instructs to execute the game program of this embodiment.

As shown in FIG. 25, if the overall game processing is started, the processor 81 displays the menu image on the display in a step S1. Although illustration is omitted, at the beginning of the start of the overall game processing, prior to performing the processing of step S1, the processor 81 determines whether the right controller 4 is attached to the additional operation apparatus, and determines, when the right controller 4 is attached to the additional operation apparatus, the type of the additional operation apparatus. Therefore, at the beginning of starting the overall game processing, in the step S1, the processor 81 displays the menu image on the display according to a result of such pre-processing. That is, the menu image in the first attached state as shown in FIG. 21, the menu image in the second attached state as shown in FIG. 22, or the menu image in the unattached state as shown in FIG. 23 is displayed on the display. Moreover, the processor 81 turns on or turns off the attachment flag 854*e* and the type determination flag 854*f* according to the result of the above-described preprocessing. In this embodiment, if the attachment flag 854*e* and the type determination flag 854*f* are turned on, according to the determined type of the additional operation apparatus, the menu image in the first attached state or the menu image in the second attached state is displayed on the display. Moreover, if the attachment flag 854*e* is turned off, the menu image in the unattached state is displayed on the display.

In a next step S3, operation data is detected. Subsequently, it is determined, in a step S5, whether the A button 53 is operated. If "YES" is determined in the step S5, that is, if the A button 53 is operated, in a step S7, the attachment flag 854*e* and the type determination flag 854*f* are turned off, and in a step S9, the individual game processing (FIG. 28-FIG. 30) described later is performed, and the process returns to the step S1. However, in the step S9, an individual game corresponding to the icon 210, 211, 212 or 213 designated or selected with the designation image 220 is performed. That is, game processing of the selected individual game is started. Moreover, although illustration is omitted, when the icon for returning to the home image is selected and turned on, the display returns to the home image, and when ending the game application in the home image is designated, the overall game processing is terminated. On the other hand, when returning to the menu image in the home image is designated, the process returns to the step S1. These matters are also the same as a case where "YES" is determined in a step S47 or a step S59 described later.

On the other hand, if "NO" is determined in the step S5, that is, if the A button 53 is not operated, it is determined, in a step S11, whether the analog stick 52 is operated. If "YES" is determined in the step S11, that is, if the analog stick 52 is operated, in a step S13, the attachment flag 854*e* and the type determination flag 854*f* are turned off, and in a step S15, a position of the designation image 220 is moved according to an operation of the analog stick 52, and then, the process returns to the step S1.

On the other hand, if "NO" is determined in the step S11, that is, if the analog stick 52 is not operated, it is determined, in a step S17, whether the marker image is detected. If "NO" is determined in the step S17, that is, if the marker image is not detected, it is determined that the right controller 4 is an unattached state where the right controller 4 is not attached to the additional operation apparatus, and in a step S19, the attachment flag 854*e* and the type determination flag 854*f* are turned off, and the process proceeds to a step S29.

In addition, although detailed description is omitted, the processing in the step S5 and the step S11 is performed before the processing of the step S17 and subsequent steps in order to prioritize the operation of the user to the right controller 4.

Moreover, although detailed description is omitted, when the menu image is being displayed on the display 12, it is possible to select the icon 210, 211, 212 or 213 by an operation of the touch panel 13. In such a case, if the user touches the icon 210, 211, 212 or 213, the touched icon 210, 211, 212 or 213 is selected, and then, the game processing of a corresponding individual game is started. In this case, an operation to the touch panel 13 is prioritized. Specifically, in the step S3, data from the touch panel controller 86 is also detected, between the steps S3 and S5, it is determined whether the icon 210, 211, 212 or 213 is selected (touched) by the operation to the touch panel 13, the process may proceed to the step S7 if "YES" is determined, and if "NO" is determined, the process may proceed to the step S5.

Moreover, if "YES" is determined in the step S17, that is, if the marker image is detected, it is determined, in a step S23, whether the marker image is moved. That is, the processor 81 determines whether an operation to the additional operation apparatus is detected.

If "NO" is determined in the step S23, that is, if the marker image is not moved, it is determined that an operation to the additional operation apparatus is not performed, and it is determined, in a step S25, whether the type determination flag 854*f* is turned on. If "YES" is determined in the step S25, that is, if the type determination flag 854*f* is turned on, it is determined that the right controller 4 is in the attached state to the additional operation apparatus and the type of the additional operation apparatus is determined, and in a step S27, the menu object according to the attached state is made to be moved straight ahead, and the process returns to the step S1. In the step S27, the processor 81 makes the menu car object 201*a* move to a position that is moved straight ahead from the current position by a distance according to the current moving speed in the first attached state, and makes the menu airplane object 202*a* move to a position that is moved straight ahead from the current position by a distance according to the current moving speed in the second attached state. At this time, the current position data 854*d* is updated.

On the other hand, if "NO" is determined in the S25, that is, if the type determination flag 854*f* is turned off, after determining that the right controller 4 is in the unattached state where the right controller 4 is unattached to the additional operation apparatus and that the type of the additional operation apparatus is not determined, the process proceeds to the step S29.

In the step S29, other game processing in the menu image, and the process returns to the step S1. In this step S29, the processor 81 performs game processing, such as changing the moving speed of the menu car object 201*a*, moving the bullet fired from the menu car object 201*a*, or moving the bullet fired from the menu airplane object 202*a*. However, since the analog stick 52 and the A button 53 are not operated, when the menu image in the unattached state is being displayed, in the step S29, a position of the designation image 220, i.e., the current position data 854*d* is not updated.

Moreover, if "YES" is determined in the step S23, that is, if the marker image is moved, it is determined that an operation to the additional operation apparatus is performed, and then, as shown in FIG. 26, it is determined, in a step S31, whether the type determination flag 854*f* is turned on. If "NO" is determined in the step S31, it is determined, in a step S33, whether the operation to the additional operation apparatus is the lowering operation or the depressing operation. Here, the processor 81 detects that the right controller 4 is in the attached state to the additional operation apparatus, and determines whether an operation that instructs to perform the processing that determines the type of the additional operation apparatus to which the right controller 4 is attached is performed. In addition, a method that the processor 81 (or game system 1) determines the turning operation, the lowering operation, the tilting operation or the depressing operation is as described above.

If "NO" is determined in the step S33, that is, if it is the turning operation or the tilting operation, it is determined that it is detected that the right controller 4 is in the attached state to the additional operation apparatus and an operation that instructs to perform the processing that determines the type of the additional operation apparatus to which the right controller 4 is attached is not performed, and then, the process returns to the step S1 shown in FIG. 25. On the other hand, if "YES" is determined in the step S33, that is, if it is the lowering operation or the depressing operation, it is detected that the right controller 4 is in the attached state to the additional operation apparatus and that an operation that instructs to perform the processing that determines the type of the additional operation apparatus to which the right controller 4 is attached is performed. Therefore, it is detected, in a subsequent step S35, that the right controller 4 is in the attached state to the additional operation apparatus, and the type of the additional operation apparatus to which the right controller 4 is attached is determined in a step S37. Then, in a step S39, the attachment flag 854*e* and the type determination flag 854*f* are turned on, and the process returns to the step S1.

However, when the marker image ("YES" is determined in the step S17) detected and the movement of the marker image is detected ("YES" is determined in the step S23), and if the movement is due to the switching operation ("YES" is determined in the step S33), in the step S35, the processor 81 detects that the right controller 4 is in the attached state to the additional operation apparatus. That is, it can be said that the processing in the step S35 is processing to detect whether the right controller 4 is in the attached state to the additional operation apparatus based on the processing in the steps S17, S25 and S33.

Moreover, if the type of the additional operation apparatus to which the right controller 4 is attached is determined in the step S37, the processor 81 stores or updates data indicative of the determined type (in this embodiment, identification information of the additional operation apparatus) in the data storage area 854 as the attachment target data 854*c*.

In addition, as described above, in this embodiment, the processor 81 detects that the right controller 4 is in the attached state to the additional operation apparatus when the user attaches the right controller 4 to the additional operation apparatus and performs the switching operation such as the lowering operation or the depressing operation. However, since the marker image is already detected before the switching operation is performed ("YES" is determined in the step S17), in other embodiments, when the user attaches the right controller 4 to the additional operation apparatus, the processor 81 may detect that the right controller 4 is in the attached state to the additional operation apparatus irrespective of whether the switching operation is performed or not.

Moreover, if "YES" is determined in the step S31, it is determined that the operation to the additional operation apparatus is an operation to control the menu object, and it is determined, in a step S41, whether the attachment state is the first attached state. Here, the processor 81 determines, with reference to the attachment target data 854*c*, whether the additional operation apparatus to which the right controller 4 is attached is the first additional operation apparatus 6.

If "NO" is determined in the step S41, that is, if it is not the first attached state, it is determined that the right controller 4 is attached to the second additional operation apparatus 7, and the process proceeds to a step S55 shown in FIG. 27. On the other hand, if "YES" is determined in the step S41, that is, if it is the first attached state, it is determined, in a step S43, whether it is the turning operation. If "YES" is determined in the step S43, that is, if it is the turning operation, a direction of the menu car object 201*a* is changed according to the turning operation in a step S45, and the process returns to the step S1. On the other hand, if "NO" is determined in the S43, that is, if it is the lowering operation, it is determined, in the step S47, whether the menu car object 201*a* is on the icon 210, 211, 212 or 213.

If "YES" is determined in the step S47, that is, if the menu car object 201*a* is on the icon 210, 211, 212 or 213, it is determined that playing a corresponding individual game is instructed, thereby to proceed to the step S9 shown in FIG. 25. On the other hand, if "NO" is determined in the S47, that is, if the menu car object 201*a* is not on the icon 210, 211, 212 or 213, it is determined, in a step S49, that it is the depressing operation of the left lever 604.

If "YES" is determined in the step S49, that is, if it is the depressing operation of the left lever 604, in a step S51, the gear of the menu car object 201*a* is changed, and the process returns to the step S1. On the other hand, if "NO" is determined in the S49, that is, if it is the lowering operation of the right lever 605, in a step S53, a bullet is fired from the menu car object 201*a*, and the process returns to the step S1.

As described above, if "NO" is determined in the S41, it is determined, in the step S55 shown in FIG. 27, whether it is the tilting operation. If "YES" is determined in the step S55, that is, if it is the tilting operation, in a step S57, a direction of the menu airplane object 202*a* is changed according to the tilting operation, and the process returns to the step S1. On the other hand, if "NO" is determined in the S55, that is, if it is the depressing operation, it is determined, in the step S59, whether the menu airplane object 202*a* is on the icon 210, 211, 212 or 213.

If "YES" is determined in the step S59, that is, if the menu airplane object 202*a* is over the icon 210, 211, 212 or 213, it is determined that playing a corresponding individual game is instructed, thereby to proceed to the step S9 shown in FIG. 25. On the other hand, if "NO" is determined in the S59, that is, if the menu airplane object 202*a* is not on the icon 210, 211, 212 or 213, in a step S61, a bullet is fired from the menu airplane object 202*a*, and the process returns to the step S1.

Figure 28:
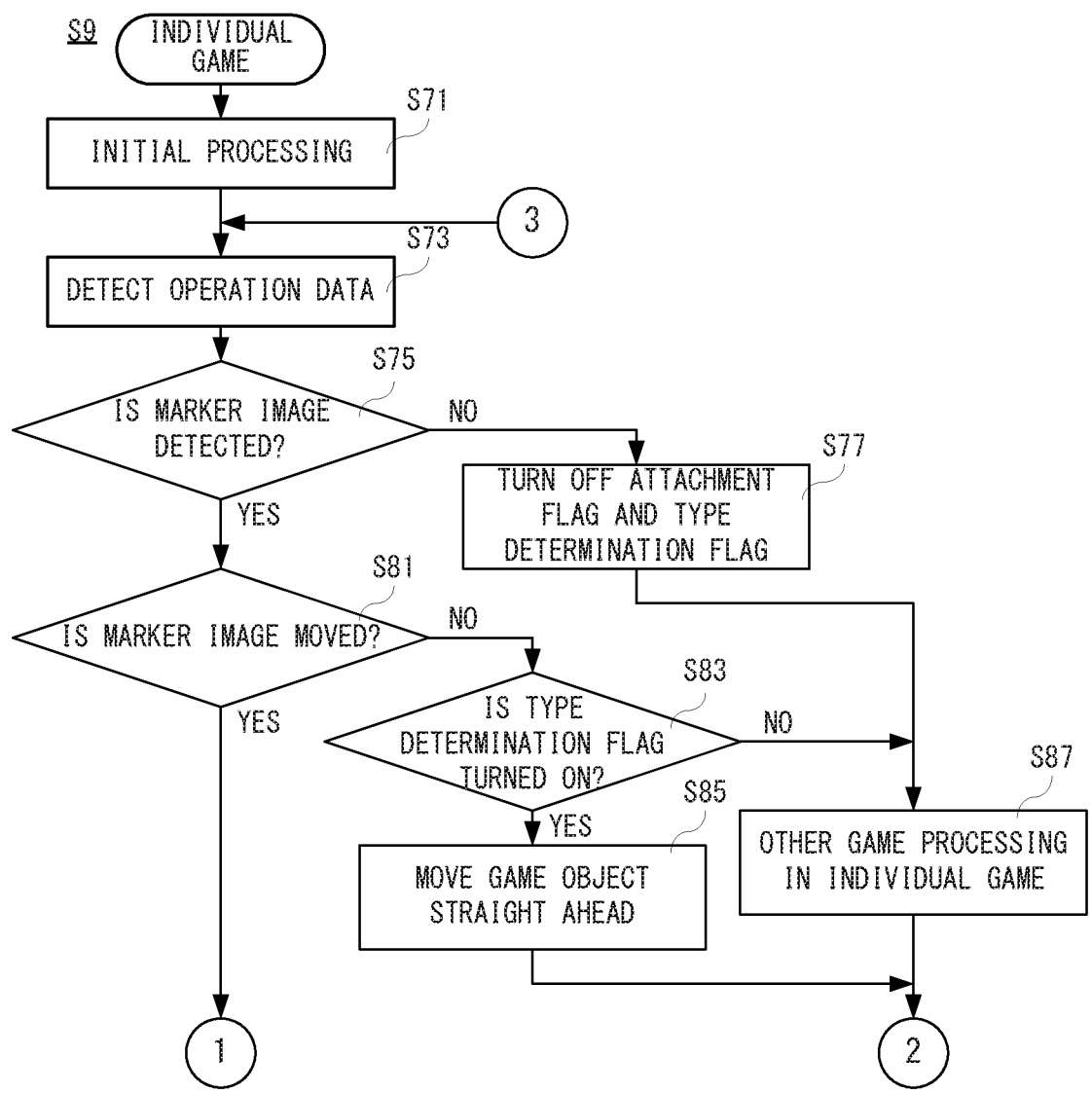
FIG. 28 is a flowchart showing a part of non-limiting example game processing of an individual game of the processor(s) by the main body apparatus shown in FIG. 6.
Figure 29:
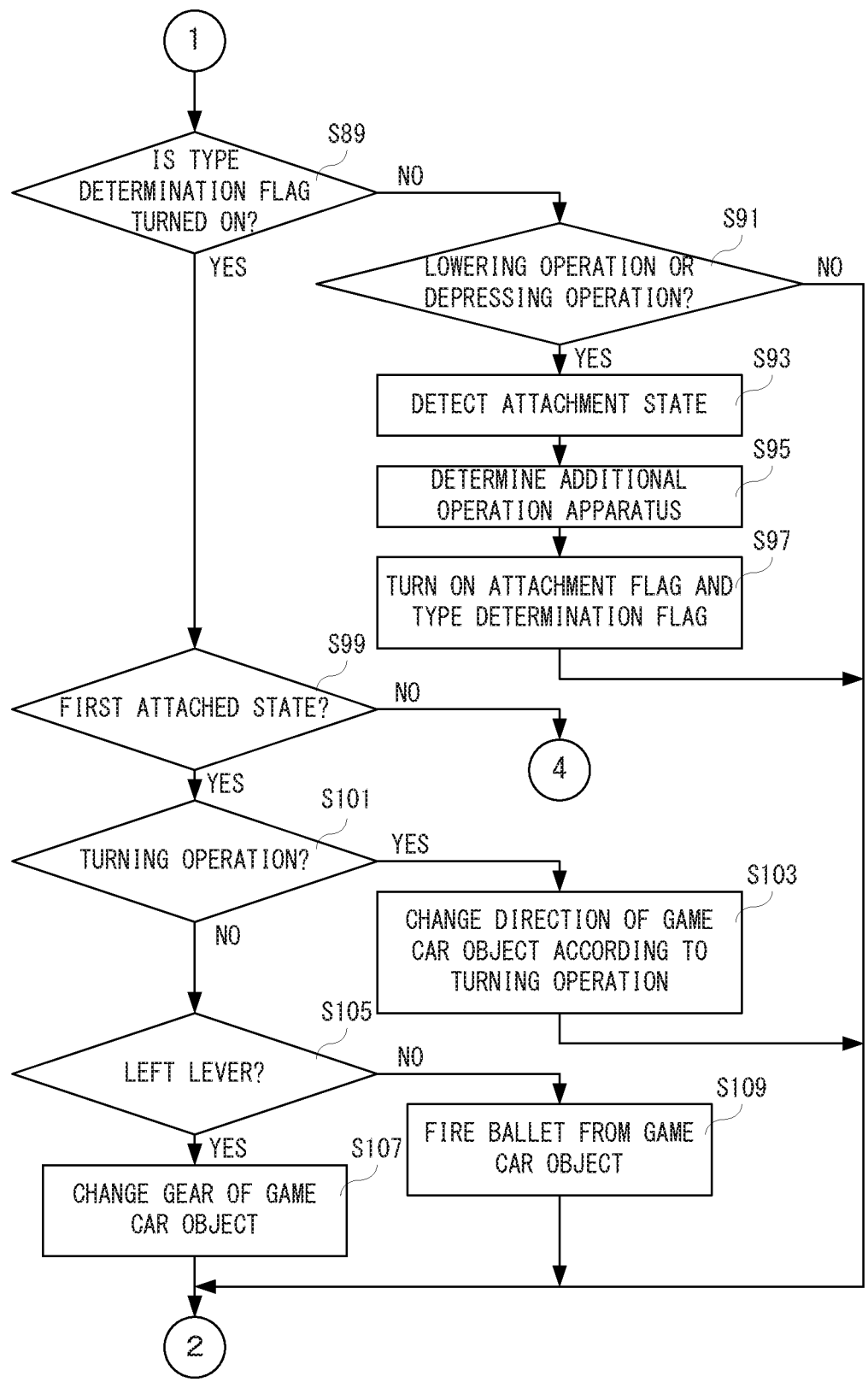
FIG. 29 is a flowchart showing another part of the non-limiting example game processing of the individual game by the processor(s) of the main body apparatus shown in FIG. 6, following FIG. 28.
Figure 30:
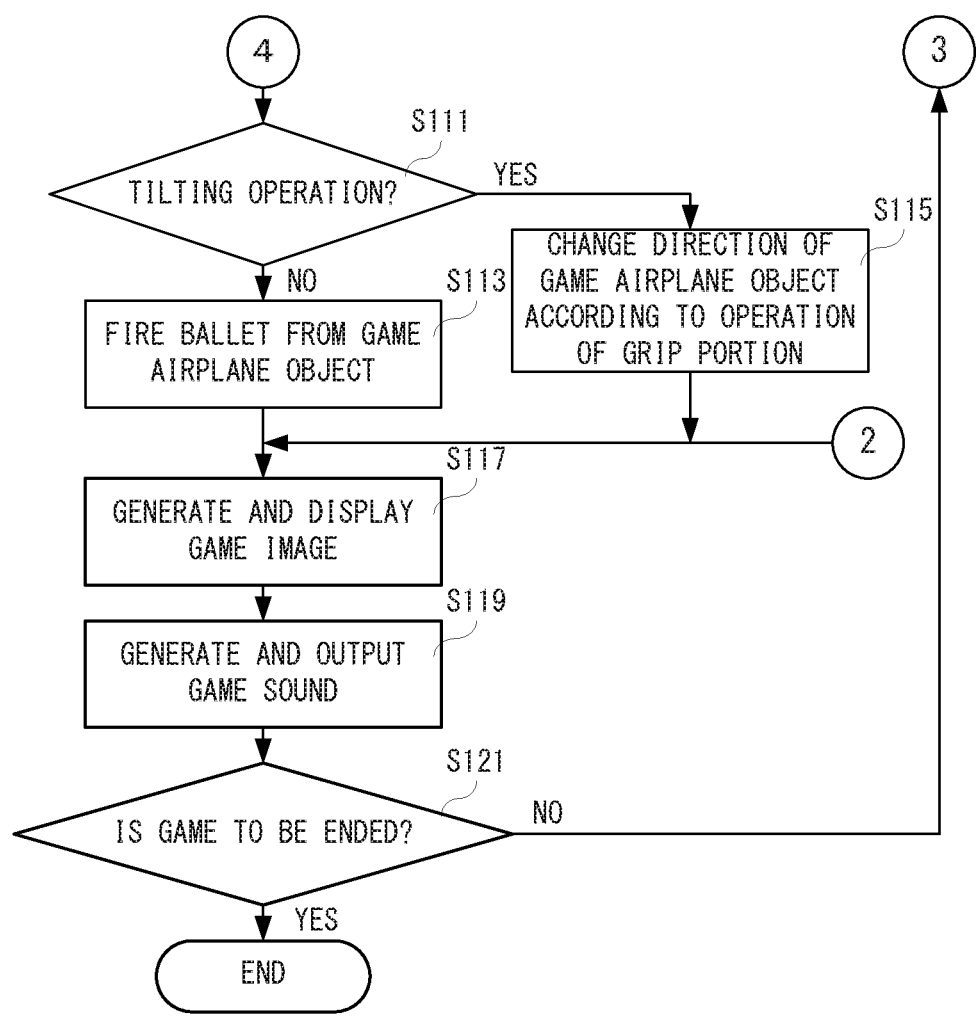
FIG. 30 is a flowchart showing the other part of non-limiting example game processing of the individual game by the processor(s) of the main body apparatus shown in FIG. 6, following FIG. 29.

FIG. 28-FIG. 30 are flowcharts showing non-limiting example processing of the individual game in the step S9 shown in FIG. 25. In the following, the game processing of the individual game will be described with reference to FIG. 28-FIG. 30; however, the same processing as the processing already described in the overall game processing of FIG. 25-FIG. 27 will be described briefly. Although detailed description of the game processing of the individual game will be omitted, as for the game processing other than the control of the game object ("other game processing" to be described later), in each of the first game to the fourth game, different processing is performed.

As shown in FIG. 28, if the game processing of the individual game is started, the processor 81 performs initial processing in a step S71. In this initial processing, for example, the processor 81 constructs a virtual game space for generating and displaying the game image, and places respective characters or objects such as a player character 200, a vehicle object (201 or 202), etc. appearing in the game space at their initial positions, and places background objects such as terrain objects to be arranged (or to be present) in this game space at predetermined positions. Furthermore, the processor 81 performs processing that sets initial values of various parameters to be used in the game processing of the individual game. Moreover, in the initial processing, an initial game image is displayed on the display.

In a next step S73, operation data is detected. Subsequently, it is determined, in a step S75, whether the marker image is detected. If "NO" is determined in the step S75, it is determined that the attachment state is the unattached state where the right controller 4 is not attached to the additional operation apparatus, and in a step S77, the attachment flag 854*e* and the type determination flag 854*f* are turned off, and the process proceeds to a step S87.

In addition, since the individual game is played using the first additional operation apparatus 6 to which the right controller 4 is attached or the second additional operation apparatus 7 to which the right controller 4 is attached, when the operation data detected in the step S73 is of the operation by the user to the right controller 4, the operation data is ignored.

Moreover, if "YES" is determined in the step S75, it is determined, in a step S81, whether the marker image is moved. If "NO" is determined in the step S81, it is determined that no operation to the additional operation apparatus is performed, and it is determined, in a step S83, whether the type determination flag 854*f* is turned on. If "NO" is determined in the step S83, the process proceeds to the step S87. On the other hand, if "YES" is determined in the step S83, the game object is caused to move straight ahead according to the attached state in a step S85, and the process proceeds to a step S117 shown in FIG. 30. In the step S85, the processor 81 makes the game car object 201 move to a position that is moved straight ahead from the current position by a distance according to the current moving speed in the first attached state, or makes the game airplane object 202 move to a position that is moved straight ahead from the current position by a distance according to the current moving speed in the second attached state. At this time, the current position data 854*d* is updated.

In the step S87, other game processing in an individual game is performed, and the progress proceeds to the step S117. In this step S87, the processor 81 performs game processing, such as changing the moving speed of the game car object 201, moving the bullet fired from the game car object 201, and moving the bullet fired from the game airplane object 202. Moreover, in this step S87, the processor 81 performs game processing, such as moving an enemy object, determining whether the bullet fired from the game vehicle object hits the enemy object, and determining of game clear or game over.

Moreover, if "YES" is determined in the step S81, it is determined that the operation to the additional operation apparatus is performed, and as shown in FIG. 29, it is determined, in a step S89, whether the type determination flag 854*f* is turned on. If "NO" is determined in the step S89, it is determined, in a step S91, whether the operation is the lowering operation or the depressing operation.

If "NO" is determined in the step S91, it is determined that it is detected that the right controller 4 is in the attached state to the additional operation apparatus and an operation that instructs to perform the processing that determines the type of the additional operation apparatus to which the right controller 4 is attached is not performed, and then, the process proceeds to the step S117. On the other hand, if "YES" is determined in the step S91, it is determined that it is detected that the right controller 4 is in the attached state to the additional operation apparatus and it is instructed to perform the processing that determines the type of the additional operation apparatus to which the right controller 4 is attached. Therefore, in a subsequent step S93, it is detected that the right controller 4 is in the attached state to the additional operation apparatus, and in a step S95, the type of the additional operation apparatus to which the right controller 4 is attached is determined. Then, in a step S97, the attachment flag 854*e* and the type determination flag 854*f* are turned on, and the process proceeds to the step S117.

Moreover, if "YES" is determined in the step S89, it is determined that the operation to the additional operation apparatus is an operation that controls the game object, and it is determined, in a step S99, whether it is the first attached state. If "NO" is determined in the step S99, the process proceeds to a step S111 shown in FIG. 30. On the other hand, if "YES" is determined in the step S99, it is determined, in a step S101, whether it is the turning operation. If "YES" is determined in the step S101, in a step S103, a direction of the game car object 201 is changed according to the turning operation, and the process proceeds to the step S117.

On the other hand, if "NO" is determined in the S101, it is determined, in a step S105, whether it is the depressing operation of the left lever 604. If "YES" is determined in the step S105, the gear of the game car object 201 is changed in a step S107, and the process proceeds to the step 117. On the other hand, if "NO" is determined in the S105, a bullet is fired from the game car object 201 in a step S109, and the process proceeds to the step S117.

As described above, if "NO" is determined in the S99, it is determined, in the step S111 shown in FIG. 30, whether it is the tilting operation. If "NO" is determined in the step S111, a bullet is fired from the game airplane object 202 in a step S113, and the process proceeds to the step S117. On the other hand, if "YES" is determined in the step S111, a direction of the game airplane object 202 is changed according to the tilting operation in a step S115, and the process proceeds to the step S117.

The game image is generated and displayed in the step S117. The processor 81 generates the game image about the game space seen from the virtual camera based on the game processing in the steps S75-S115, and displays the game image on the display. In a next step S119, a game sound is generated and output. The processor 81 generates the game sound based on the game processing in the steps S75-S115, thereby outputting from the speakers 88 or a speaker of the television that is an example of the stationary monitor.

Then, is determined whether the game is to be ended in a step S121. Here, the processor 81 determines whether ending the game is instructed by the user, or it becomes the game clear or game over. If "NO" is determined in the step S121, that is, if it is not the ending of the game, the process returns to the step S73. On the other hand, if "YES" is determined in the step S121, that is, if it is the ending of the game, the game processing of the individual game is terminated.

According to this embodiment, in the menu image, the designation image is operated by the operation portion of the controller, and if the controller is attached to the additional operation apparatus, the menu object is operated by operating the additional operation apparatus, and therefore, more various operations using the controller can be implemented.

Moreover, according to this embodiment, in also the menu selection processing, the vehicle object similar to the vehicle object that is operated in the game processing of the individual game is displayed as the designation image and controlled by the same operation, and therefore, even if the operation target is changed from the game vehicle object to the menu vehicle object, by operating the menu vehicle object with the same operational feeling as that of the game vehicle object, a further individual game can be selected. Moreover, it is not necessary to change the operation apparatus, and it is possible to seamlessly perform playing of the individual game, and selection and execution of the menu. Furthermore, prior to playing the individual game, the operation method of the vehicle object can be acquired and/or learned.

In addition, in this embodiment, the type of the additional operation apparatus to which the right controller is attached is determined according to having determined not only that the right controller is attached to the additional operation apparatus but also that the lowering operation or the depressing operation is performed; however, it does not need to be limited to this. In other embodiments, the type of the additional operation apparatus to which the right controller is attached may be determined according to having determined that the right controller is attached to the additional operation apparatus.

Moreover, although it is made not to receive an operation by the operation portion provided on the controller in the game processing of the individual game in this embodiment, an operation by the operation portion provided on the controller may be received. In such a case, a movement of the game object is controlled so as to control a movement of the designation image in the menu image. That is, a direction of the game object is changed according to an operation of the analog stick.

Furthermore, this embodiment is described about the vehicle object that is moved straight ahead when no direction changing operation is performed, such as the car object or the airplane object; however, such a vehicle object may be moved along a circular trajectory clockwise or counterclockwise, or may be reciprocated on a straight line. In this case, an object such as an icon is selected by changing a moving direction of the vehicle object on the circular trajectory or the straight line.

Furthermore, in this embodiment, the car object or the airplane object is moved straight ahead even if no operation is performed when the right controller is attached to the additional operation apparatus, but the same may be moved straight ahead in response to an operation by the user. For example, a predetermined button or switch of the left controller is operated, or a posture or an orientation of the left controller is changed, so that the car object or the airplane object can be moved straight ahead.

Moreover, the configuration of the game system shown in this embodiment is mere example, and it does not need to be limited to this, and a further configuration can be adopted. In this embodiment, for example, the above-described "computer" is a single computer (specifically, the processor 81), but a plurality of computers may be used in other embodiments. For example, the above-described "computer" may be (a plurality of) computers provided in a plurality of apparatuses, and more specifically, the above-described "computer" may be configured by the processor 81 of the main body apparatus 2 and the communication control sections (microprocessors) 101 and 111 of the controllers 3 and 4.

Furthermore, although the additional operation apparatus to which the controller that is attachable/detachable to/from the main body apparatus is attached is operated in this embodiment, instead the controller, an electronic apparatus that is provided with the infrared imaging section, the acceleration sensor and the angular velocity sensor and configured to be performable communication with the main body apparatus may be attached to the main body apparatus. In such a case, the overall game processing including the game processing of the individual game may be performed by the processor on a side of the electronic apparatus, and processing results may be transmitted to the main body apparatus.

Furthermore, specific numeral values, images and configurations of the additional operation apparatuses shown in the above-described embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A game system, comprising:
a game controller having an operation portion;
an accessory to which the game controller is attachable; and
processing circuitry configured to perform predetermined game processing based on an operation to the accessory to which the game controller is attached, the processing circuitry configured to:
display a selection image for performing a selection operation related to game processing;

enable selection of the selection image by a first method based on an operation to the operation portion of the game controller;

detect that the game controller is in an attached state to the accessory; and enable selection of the selection image by a second method different from the first method based on an operation to the accessory when the game controller is detected as being in the attached state, wherein a designation image displayed in association with the selection image is displayed in a first manner before the game controller is attached to the accessory, and the designation image displayed in association with the selection image is displayed in a second manner after the game controller is attached to the accessory.

2. The game system according to claim 1, wherein the game controller further comprises an operation detection portion configured to detect an operation to the accessory, and the selection image is selectable by the second method based on a detection result by the operation detection portion of the game controller.

3. The game system according to claim 2, wherein the operation detection portion of the game controller includes an imaging device, and the accessory comprises:
  an operation portion,
  a movable portion configured to be moved according to an operation to the operation portion, and
  a detection target that is provided on the movable portion and is configured to be imaged by the imaging device of the game controller attached to the accessory, and the processing circuitry is further configured to determine an operation manner to the accessory based on at least one of a position, a shape and a direction of the detection target included in an image that is imaged by the imaging device.

4. The game system according to claim 2, wherein the operation detection portion of the game controller includes an imaging device, the accessory further comprises an insertion portion for inserting and attaching the game controller, and a detection target that is provided in an inside of the accessory and is configured to be imaged by the imaging device of the game controller, and the processing circuitry is further configured to detect whether the game controller is in an attached state to the accessory based on an image including the detection target imaged by the imaging device of the game controller that is being inserted and attached to the insertion portion.

5. The game system according to claim 2, wherein the processing circuitry performs predetermined game processing based on a detection result of the operation detection portion.

6. The game system according to claim 1, wherein the processing circuitry is configured to display a first object, and enable selection of the selection image by operating the first object based on an operation to the accessory, as the second method.

7. The game system according to claim 6, wherein the processing circuitry is configured to display a second object when the game processing is to be performed, cause the second object to move in a direction based on a direction instructing operation to the accessory, and cause, based on the same direction instructing operation to the accessory, the first object to move in the same direction.

8. The game system according to claim 1, wherein the processing circuitry is further configured to start the game processing by selecting the selection image.

9. The game system according to claim 1, wherein the processing circuitry is configured to further display a predetermined object that is operable based on the operation to the accessory when selection becomes to be enabled.

10. The game system according to claim 1, wherein the processing circuitry is configured to display a first object that is operable based on the operation to the accessory when the game controller is detected as being in an attached state to the accessory, and display the second object related in appearance to the first object when the game processing is to be performed.

11. The game system according to claim 1, wherein the selection image remains unchanged regardless of whether the game controller is attached to the accessory.

12. The game system according to claim 1, wherein when the selection image is displayed, the designation image displayed in the selection image is viewed from above the object.

13. The game system according to claim 1, wherein
  the game controller is in a first attached state when attached to a first accessory,
  the game controller is in a second attached state when attached to a second accessory, and
  the designation image changes display manner based on whether the game controller is in the first or the second attached state.

14. The game system according to claim 13, wherein an operation method associated with the designation image changes based on whether the game controller is in the first or the second attached state.

15. The game system according to claim 13, wherein
  a player object, displayed in association with the game processing, changes based on whether the game controller is in the first or the second attached state, and
  a control method of the player object changes based on whether the game controller is in the first or the second attached state.

16. The game system according to claim 15, wherein
  the designation image displayed in association with the selection image is displayed in an appearance corresponding to the player object displayed in association with the game processing, and
  an operation method associated with the designation image corresponds to the control method of the player object.

17. A game apparatus configured to communicate with a game controller having an operation portion, wherein the game controller is attachable to an accessory, and the game apparatus is configured to perform predetermined game processing based on an operation to the accessory to which the game controller is attached, the game apparatus comprising:

a processor; and a memory configured to store computer readable instructions that, when executed by the processor, cause the game apparatus to:

display a selection image for performing a selection operation related to game processing;

enable selection of the selection image by a first method based on an operation to the operation portion of the game controller;

detect that the game controller is in an attached state to the accessory; and enable selection of the selection image by a second method different from the first method based on an operation to the accessory when the game controller is detected as being in the attached state, wherein a designation image displayed in association with the selection image is displayed in a first manner before the game controller is attached to the accessory, and the designation image displayed in association with the selection image is displayed in a second manner after the game controller is attached to the accessory.

18. A non-transitory computer-readable storage medium storing a game program executable by a computer of a game system comprising a game controller having an operation portion, an accessory to which the game controller is attachable, and processing circuitry configured to perform predetermined game processing based on an operation to the accessory to which the game controller is attached, wherein the game program causes one or more processors of the computer to provide execution comprising:

displaying a selection image for performing a selection operation for game processing;

enabling selection of the selection image by a first method based on an operation to the operation portion of the game controller;

detecting that the game controller is in an attached state to the accessory; and enabling selection of the selection image by a second method different from the first method based on an operation to the accessory when the game controller is detected as being in the attached state, wherein a designation image displayed in association with the selection image is displayed in a first manner before the game controller is attached to the accessory, and the designation image displayed in association with the selection image is displayed in a second manner after the game controller is attached to the accessory.

19. A game control method of a game system comprising a game controller having an operation portion, an accessory to which the game controller is attachable, and a processing circuitry configured to perform predetermined game processing based on an operation to the accessory to which the game controller is attached, the game control method comprising:

(a) displaying a selection image for performing a selection operation for game processing;

(b) enabling selection of the selection image by a first method based on an operation to the operation portion of the game controller;

(c) detecting that the game controller is in an attached state to the accessory; and (d) enabling selection of the selection image by a second method different from the first method based on an operation to the accessory when the game controller is detected as being in the attached state, wherein a designation image displayed in association with the selection image is displayed in a first manner before the game controller is attached to the accessory, and the designation image displayed in association with the selection image is displayed in a second manner after the game controller is attached to the accessory.

* * * * *